(12) United States Patent
Singh et al.

(10) Patent No.: US 12,520,156 B2
(45) Date of Patent: Jan. 6, 2026

(54) NEIGHBOR AWARENESS NETWORKING PAIRING TERMINATION

(71) Applicant: QUALCOMM Incorporated, San Diego, CA (US)

(72) Inventors: Harbeer Singh, Hyderabad (IN); Sudhanshu Singh, Hyderabad (IN); Vamsi Sanka, Hyderabad (IN); Shivraj Singh Sandhu, Milpitas, CA (US); Alireza Raissinia, Monte Sereno, CA (US)

(73) Assignee: QUALCOMM Incorporated, San Diego, CA (US)

( * ) Notice: Subject to any disclaimer, the term of this patent is extended or adjusted under 35 U.S.C. 154(b) by 299 days.

(21) Appl. No.: 18/148,125

(22) Filed: Dec. 29, 2022

(65) Prior Publication Data
US 2024/0224048 A1    Jul. 4, 2024

(51) Int. Cl.
*H04W 12/50*    (2021.01)
*H04W 8/00*    (2009.01)
*H04W 12/06*    (2021.01)

(52) U.S. Cl.
CPC ........... *H04W 12/50* (2021.01); *H04W 8/005* (2013.01); *H04W 12/06* (2013.01)

(58) Field of Classification Search
CPC ...... H04W 12/50; H04W 12/06; H04W 8/005
See application file for complete search history.

(56) References Cited

U.S. PATENT DOCUMENTS

| | | | |
|---|---|---|---|
| 10,966,277 B1* | 3/2021 | Shukla ................... | H04W 12/12 |
| 2015/0312319 A1* | 10/2015 | Wentink ................ | H04W 72/21 |
| | | | 370/329 |
| 2015/0341447 A1* | 11/2015 | Patil ....................... | H04L 43/10 |
| | | | 370/329 |
| 2016/0219050 A1* | 7/2016 | Zou ....................... | H04W 12/04 |
| 2019/0380034 A1* | 12/2019 | Montemurro ......... | H04W 12/08 |

OTHER PUBLICATIONS

WIFI: "Wi-Fi CERTIFIED Wi-Fi Aware™ Test Plan", Wi-Fi Alliance, Based on Wi-Fi Aware Test Plan Version 3.2, 2022, 63 pages.

* cited by examiner

*Primary Examiner* — Vance M Little
(74) *Attorney, Agent, or Firm* — Holland & Hart LLP

(57) ABSTRACT

Methods, systems, and devices for wireless communications are described. Techniques described herein provide for a termination of a neighbor awareness networking (NAN) pairing session between a first NAN device and a second NAN device. A first NAN device that has initiated a pairing session with a second NAN device may transmit a deauthentication frame to the other NAN device to terminate the pairing session and remove the authentication key(s). The first NAN device and second NAN device terminate the pairing session and remove the authentication key(s). The deauthentication frame may include a header that indicates the addresses for the first and second NAN devices. In some cases, the first NAN device may establish NAN communications with multiple peer devices (e.g., in a NAN cluster). The first NAN device may multicast the deauthentication frame to the multiple devices. The multicast deauthentication frame may include an identifier for the NAN cluster.

30 Claims, 13 Drawing Sheets

NEIGHBOR AWARENESS NETWORKING PAIRING TERMINATION

BACKGROUND

The following relates to wireless communications, including neighbor awareness networking (NAN) pairing termination.

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a WLAN, such as a Wi-Fi (i.e., Institute of Electrical and Electronics Engineers (IEEE) 802.11) network may include AP that may communicate with one or more stations (STA)s or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink (DL) and uplink (UL). The DL (or forward link) may refer to the communication link from the AP to the station, and the UL (or reverse link) may refer to the communication link from the station to the AP.

SUMMARY

The described techniques relate to improved methods, systems, devices, or apparatuses that support neighbor awareness networking (NAN) pairing termination. NAN may also be referred to as Wi-Fi aware. A first NAN device that has initiated a pairing session with another NAN device (second NAN device) may transmit a deauthentication frame to the second NAN device to terminate the pairing session and remove the authentication key(s). The first NAN device and second NAN device may then terminate the pairing session and remove the authentication key(s). The deauthentication frame may include a header that indicates the address for the first NAN device and the address for the second NAN device. In some cases, the first device may establish NAN communications with multiple peer devices (e.g., in a NAN cluster). The first device may multicast the deauthentication frame to the multiple devices. The multicast deauthentication frame may include an identifier for the NAN cluster.

A method for wireless communications at a first wireless device is described. The method may include communicating with a second wireless device using a NAN protocol to initiate a pairing session between the first wireless device and the second wireless device, transmitting, to the second wireless device, a deauthentication frame indicating to end the pairing session, and terminating the pairing session with the second wireless device in response to transmitting the deauthentication frame.

An apparatus for wireless communications at a first wireless device is described. The apparatus may include a processor, memory coupled with the processor, and instructions stored in the memory. The instructions may be executable by the processor to cause the apparatus to communicate with a second wireless device using a NAN protocol to initiate a pairing session between the first wireless device and the second wireless device, transmit, to the second wireless device, a deauthentication frame indicating to end the pairing session, and terminate the pairing session with the second wireless device in response to transmitting the deauthentication frame.

Another apparatus for wireless communications at a first wireless device is described. The apparatus may include means for communicating with a second wireless device using a NAN protocol to initiate a pairing session between the first wireless device and the second wireless device, means for transmitting, to the second wireless device, a deauthentication frame indicating to end the pairing session, and means for terminating the pairing session with the second wireless device in response to transmitting the deauthentication frame.

A non-transitory computer-readable medium storing code for wireless communications at a first wireless device is described. The code may include instructions executable by a processor to communicate with a second wireless device using a NAN protocol to initiate a pairing session between the first wireless device and the second wireless device, transmit, to the second wireless device, a deauthentication frame indicating to end the pairing session, and terminate the pairing session with the second wireless device in response to transmitting the deauthentication frame.

In some examples of the method, apparatuses, and non-transitory computer-readable medium described herein terminating the pairing session may include operations, features, means, or instructions for removing an authentication key for communication between the first wireless device and the second wireless device.

Some examples of the method, apparatuses, and non-transitory computer-readable medium described herein may further include operations, features, means, or instructions for deriving, based on the pairing session, the authentication key.

Some examples of the method, apparatuses, and non-transitory computer-readable medium described herein may further include operations, features, means, or instructions for encrypting the deauthentication frame using the authentication key.

Some examples of the method, apparatuses, and non-transitory computer-readable medium described herein may further include operations, features, means, or instructions for receiving, from the second wireless device, an acknowledgment message in response to the deauthentication frame.

In some examples of the method, apparatuses, and non-transitory computer-readable medium described herein, transmitting the deauthentication frame may include operations, features, means, or instructions for unicasting the deauthentication frame to the second wireless device.

In some examples of the method, apparatuses, and non-transitory computer-readable medium described herein, the deauthentication frame includes a header indicating a first interface address associated with the first wireless device and a second interface address associated with the second wireless device.

In some examples of the method, apparatuses, and non-transitory computer-readable medium described herein, the deauthentication frame includes a field indicating a reason for terminating the pairing session.

In some examples of the method, apparatuses, and non-transitory computer-readable medium described herein, transmitting the deauthentication frame may include operations, features, means, or instructions for multicasting the deauthentication frame to the second wireless device and a third wireless device.

In some examples of the method, apparatuses, and non-transitory computer-readable medium described herein, the deauthentication frame includes a header indicating a first interface address associated with the first wireless device and an identifier associated with a NAN cluster including the first wireless device, the second wireless device, and the third wireless device.

In some examples of the method, apparatuses, and non-transitory computer-readable medium described herein, transmitting the deauthentication frame may include operations, features, means, or instructions for transmitting the deauthentication frame in accordance with a group authentication key common to the first wireless device, the second wireless device, and the third wireless device.

Some examples of the method, apparatuses, and non-transitory computer-readable medium described herein may further include operations, features, means, or instructions for receiving, from the second wireless device, a security association query message in response to the deauthentication frame and refraining from transmitting a response to the security association query message.

Some examples of the method, apparatuses, and non-transitory computer-readable medium described herein may further include operations, features, means, or instructions for receiving, from the second wireless device, a security association query message and transmitting, to the second wireless device, a security association response message key in response to the security association query message.

A method for wireless communications at a second wireless device is described. The method may include communicating with a first wireless device using a NAN protocol to initiate a pairing session between the first wireless device and the second wireless device, receiving, from the first wireless device, a deauthentication frame indicating to end the pairing session, and terminating the pairing session with the first wireless device in response to receiving the deauthentication frame.

An apparatus for wireless communications at a second wireless device is described. The apparatus may include a processor, memory coupled with the processor, and instructions stored in the memory. The instructions may be executable by the processor to cause the apparatus to communicate with a first wireless device using a NAN protocol to initiate a pairing session between the first wireless device and the second wireless device, receive, from the first wireless device, a deauthentication frame indicating to end the pairing session, and terminate the pairing session with the first wireless device in response to receiving the deauthentication frame.

Another apparatus for wireless communications at a second wireless device is described. The apparatus may include means for communicating with a first wireless device using a NAN protocol to initiate a pairing session between the first wireless device and the second wireless device, means for receiving, from the first wireless device, a deauthentication frame indicating to end the pairing session, and means for terminating the pairing session with the first wireless device in response to receiving the deauthentication frame.

A non-transitory computer-readable medium storing code for wireless communications at a second wireless device is described. The code may include instructions executable by a processor to communicate with a first wireless device using a NAN protocol to initiate a pairing session between the first wireless device and the second wireless device, receive, from the first wireless device, a deauthentication frame indicating to end the pairing session, and terminate the pairing session with the first wireless device in response to receiving the deauthentication frame.

In some examples of the method, apparatuses, and non-transitory computer-readable medium described herein terminating the pairing session may include operations, features, means, or instructions for removing an authentication key for communication between the first wireless device and the second wireless device.

Some examples of the method, apparatuses, and non-transitory computer-readable medium described herein may further include operations, features, means, or instructions for deriving, based on the pairing session, the authentication key.

Some examples of the method, apparatuses, and non-transitory computer-readable medium described herein may further include operations, features, means, or instructions for decrypting the deauthentication frame using the authentication key.

Some examples of the method, apparatuses, and non-transitory computer-readable medium described herein may further include operations, features, means, or instructions for transmitting, to the first wireless device, an acknowledgment message in response to the deauthentication frame.

In some examples of the method, apparatuses, and non-transitory computer-readable medium described herein, the deauthentication frame includes a header indicating a first interface address associated with the first wireless device and a second interface address associated with the second wireless device.

In some examples of the method, apparatuses, and non-transitory computer-readable medium described herein, the deauthentication frame includes a field indicating a reason for terminating the pairing session.

In some examples of the method, apparatuses, and non-transitory computer-readable medium described herein, the deauthentication frame includes a header indicating a first interface address associated with the first wireless device and an identifier associated with a NAN cluster including the first wireless device, the second wireless device, and a third wireless device.

In some examples of the method, apparatuses, and non-transitory computer-readable medium described herein, receiving the deauthentication frame may include operations, features, means, or instructions for receiving the deauthentication frame in accordance with a group authentication key common to the first wireless device, the second wireless device, and a third wireless device.

Some examples of the method, apparatuses, and non-transitory computer-readable medium described herein may further include operations, features, means, or instructions for transmitting, to the first wireless device, a security association query message and receiving, from the first wireless device, a security association response message key in response to the security association query message.

Some examples of the method, apparatuses, and non-transitory computer-readable medium described herein may further include operations, features, means, or instructions for transmitting, to the first wireless device, a security association query message in response to the deauthentication frame, where terminating the pairing session may be based on an absence of a response from the first wireless device to the security association query message within a query timeout period.

DETAILED DESCRIPTION

Figure 1:
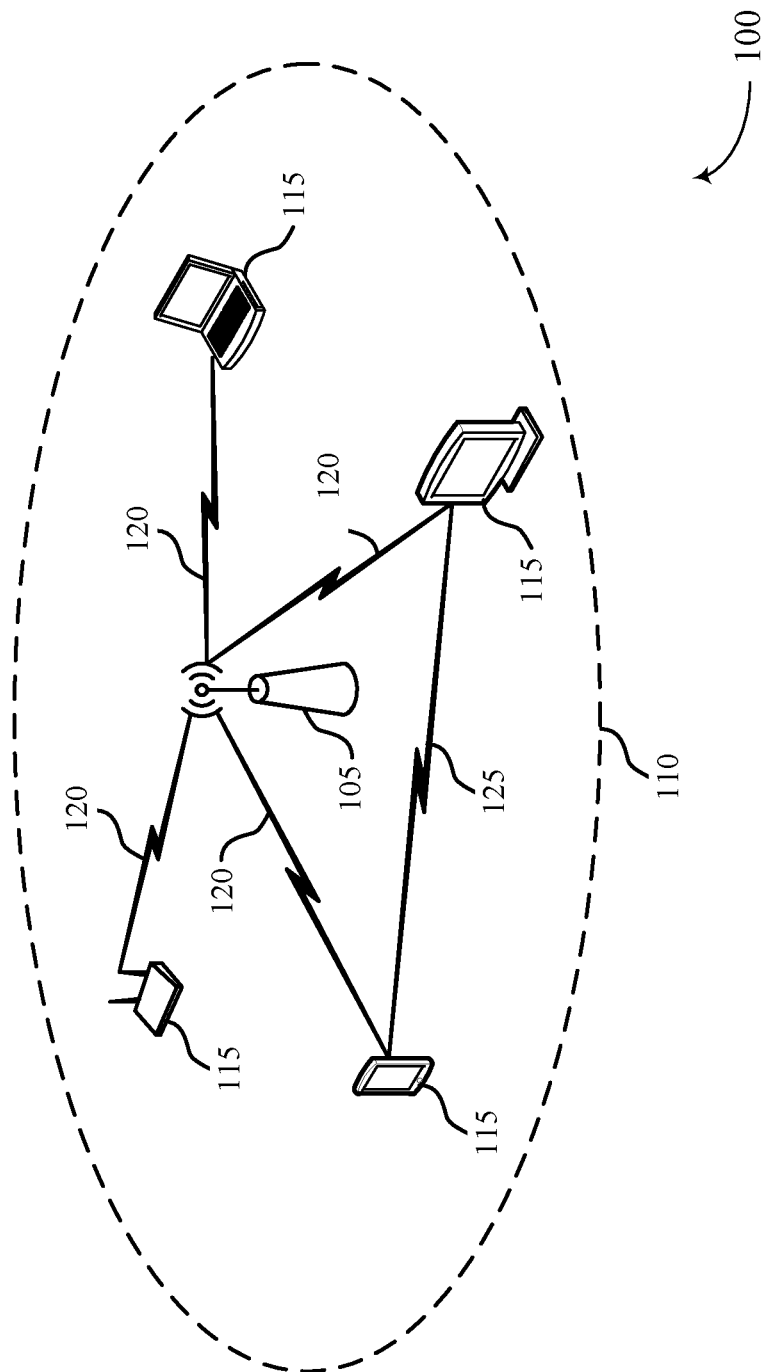
FIG. 1 illustrates an example of a wireless local area network (WLAN) that supports neighbor awareness networking (NAN) pairing termination in accordance with aspects of the present disclosure.

In some wireless communications systems, wireless devices may communicate using a Wi-Fi radio access technology (RAT). Wireless devices may communicate directly using links, such as peer-to-peer (P2P) links, in a wireless local area network (WLAN). For example, wireless devices, such as stations (STA)s or other mobile devices, may communicate directly with each other using a neighbor awareness networking (NAN) protocol, for example, without the use of an intermediary access point (AP) (e.g., a router or a gateway device). NAN may also be referred to as Wi-Fi aware. In some examples, while performing NAN communications, wireless devices may establish a cluster of local devices and may perform service discovery by exchanging one or more service discovery frames (SDF) before forming a NAN data path (NDP) between the wireless devices based on the SDFs. NAN devices may authenticate each other using a pairing protocol to initiate a pairing session. For example, a NAN pairing setup may include an out-of-band (OOB) bootstrapping to enable a bootstrapping initiator and a bootstrapping responder to possess a same pairing credential (e.g., a common password). Once authenticated, communication between NAN devices in the pairing session is secured using authentication keys derived during the pairing protocol. Currently, there are no procedures for ending a NAN pairing session other than the lifetime expiration of an authentication key. If a first NAN device removes an authentication key without informing a second NAN device, information loss and decryption error may occur, as the second NAN device may be unaware that the NAN pairing session is terminated any may transmit messages to the first NAN device using the authentication key that the first NAN device removed.

Accordingly, a first NAN device in a pairing session with a second NAN device may transmit a deauthentication frame to the second NAN device to terminate the pairing session. The first NAN device and second NAN device may terminate the pairing session in response to or based on the deauthentication frame. Accordingly, a first NAN device may terminate a NAN pairing session before and/or independent of the lifetime expiration of the authentication key associated with the pairing session, thus preventing information loss and decryption error since both the first NAN device and the second NAN device are aware or informed of the NAN pairing session being terminated. For example, the deauthentication frame may further indicate to remove the authentication key(s), terminating the NAN pairinsg session may include or be associated with removing the authentication key(s), and the first NAN device may inform the second NAN device to remove the authentication key(s). Moreover, the second NAN device may initiate a new NAN pairing session if the second NAN device determines to transmit a message to the first NAN device instead of transmitting the message using the authentication key that the first NAN device removed (and thus would be undecipherable by the first NAN device).

The deauthentication frame may be secured using the authentication key for NAN communications between the first NAN device and the second NAN device. The deauthentication frame may include a header that indicates the address for the first NAN device and the address for the second NAN device. In some cases, the first NAN device may establish NAN communications with multiple peer devices (e.g., in a NAN cluster). The first NAN device may multicast the deauthentication frame to the multiple devices. The multicast deauthentication frame may include an identifier for the NAN cluster. Accordingly, a NAN device communicating with multiple NAN devices in a NAN cluster may indicate to the multiple NAN devices in a single deauthentication frame that the NAN device is leaving the NAN cluster, and the other NAN devices may refrain from transmitting messages to the NAN device that would be lost (e.g., because the NAN device removed the group authentication key). In some examples, to prevent deauthentication attacks, a NAN device that receives a deauthentication frame may transmit a security association query to the NAN device indicated as the sender in the deauthentication frame header. If the receiving NAN device receives a security association response from the other NAN device using the authentication key (e.g., encrypted using the authentication/pairing key), the receiving NAN device can ignore the deauthentication frame and continue the NAN pairing session. If the receiving NAN device does not receive a security association response from the other NAN device, the receiving NAN device may terminate the NAN pairing session and remove the authentication key(s). Accordingly, NAN devices may check whether a deauthentication frame is legitimate prior to removing the authentication key, which may reduce latency and prevent message loss due to unauthorized NAN pairing termination.

Aspects of the disclosure are initially described in the context of a WLAN. Aspects of the disclosure are additionally illustrated with reference to WLANs and process flows. Aspects of the disclosure are further illustrated by and described with reference to apparatus diagrams, system diagrams, and flowcharts that relate to NAN pairing termination FIG. 1 illustrates a WLAN 100 (also known as a Wi-Fi network) configured in accordance with various aspects of the present disclosure. The WLAN 100 may include an AP 105 and multiple associated STAs 115, which may represent devices such as mobile stations, personal digital assistant (PDAs), other handheld devices, netbooks, notebook computers, tablet computers, laptops, display devices (e.g., TVs, computer monitors, etc.), printers, etc. The AP 105 and the associated stations 115 may represent a basic service set (BSS) or an extended service set (ESS). The various STAs 115 in the network are able to communicate with one another through the AP 105. Also shown is a coverage area 110 of the AP 105, which may represent a basic service area (BSA) of the WLAN 100. An extended network station (not shown) associated with the WLAN 100 may be connected to a wired or wireless distribution system that may allow multiple APs 105 to be connected in an ESS.

Although not shown in FIG. 1, a STA 115 may be located in the intersection of more than one coverage area 110 and may associate with more than one AP 105. A single AP 105 and an associated set of STAs 115 may be referred to as a BSS. An ESS is a set of connected BSSs. A distribution system (not shown) may be used to connect APs 105 in an ESS. In some cases, the coverage area 110 of an AP 105 may be divided into sectors (also not shown). The WLAN 100 may include APs 105 of different types (e.g., metropolitan area, home network, etc.), with varying and overlapping coverage areas 110. Two STAs 115 may also communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and medium access control (MAC) layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within WLAN 100.

In some cases, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (e.g., carrier-sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request-to-send (RTS) packet transmitted by a sending STA 115 (or AP 105) and a clear-to-send (CTS) packet transmitted by the receiving STA 115 (or AP 105). This may alert other devices within range of the sender and receiver not to transmit for the duration of the primary transmission. Thus, RTS/CTS may help mitigate a hidden node problem.

Wireless devices (e.g., STAs 115) in the WLAN 100 may communicate directly using direct wireless links 125, such as peer-to-peer (P2P) links. For example, wireless devices, such as STAs or other mobile devices, may communicate directly with each other using NAN, for example, without the use of an intermediary access point (AP) (such as, a router, a gateway device, among other examples). While performing NAN communications, wireless devices may establish a cluster of local devices and may perform service discovery by exchanging one or more SDFs before forming an NDP between the wireless devices based on the SDFs. NAN devices may authenticate each other using a pairing protocol to initiate a pairing session. Once authenticated, communication between NAN devices in the pairing session is secured using authentication keys derived during the pairing protocol.

A first NAN device in a pairing session with a second NAN device may transmit a deauthentication frame to the second NAN device to terminate the pairing session and remove the authentication key(s). The first NAN device and second NAN device may terminate the pairing session and remove the authentication key(s). Accordingly, a first NAN device may terminate a NAN pairing session and inform the other paired NAN device to remove the authentication key, thus preventing information loss and decryption error.

The deauthentication frame may be secured using the authentication key for NAN communications between the first NAN device and the second NAN device. The deauthentication frame may include a header that indicates the address for the first NAN device and the address for the second NAN device. In some cases, the first NAN device may establish NAN communications with multiple peer devices (e.g., in a NAN cluster). The first NAN device may multicast the deauthentication frame to the multiple devices. The multicast deauthentication frame may include an identifier for the NAN cluster. To prevent deauthentication attacks, a NAN device that receives a deauthentication frame may transmit a security association query to the NAN device indicated as the sender in the deauthentication frame header. If the receiving NAN device receives a security association response from the other NAN device using the authentication key, the receiving NAN device can ignore the deauthentication frame and continue the NAN pairing session. If the receiving NAN device does not receive a security association response from the other NAN device, the receiving NAN device may terminate the NAN pairing session and remove the authentication key(s).

Figure 2:
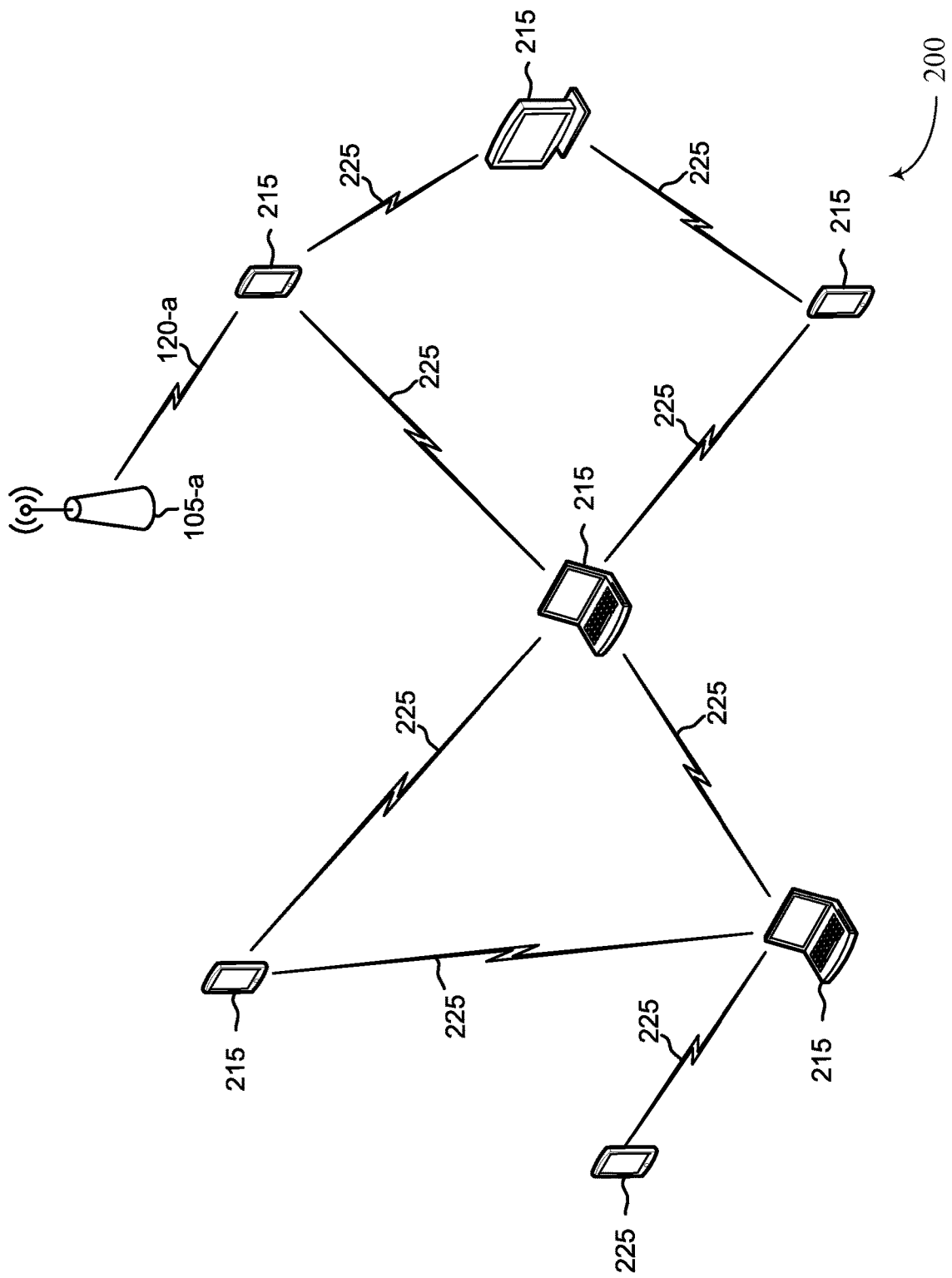
FIG. 2 illustrates an example of a WLAN that supports NAN pairing termination in accordance with one or more aspects of the present disclosure.

FIG. 2 illustrates an example of a WLAN 200 that supports NAN pairing termination in accordance with one or more aspects of the present disclosure. The WLAN 200 may implement or be implemented by aspects of the WLAN 100. For example, the WLAN 200 can be a network implementing at least one of the IEEE 802.11 family of standards. The WLAN 200 may include a central AP 105-*a* and STAs 215. The STAs 215 may communicate with the central AP 105-*a* via wireless link 120-*a*.

The WLAN 200 may be an example of a P2P, ad hoc or mesh network. STAs 215 may communicate directly with each other via P2P wireless links 225 (e.g., without the use of an intermediary AP). In some implementations, the WLAN 200 is an example of a NAN network. NANs operate in accordance with the Wi-Fi Alliance (WFA) NAN standard specification. NAN-compliant STAs 215 ("NAN devices 215") transmit and receive NAN communications (for example, in the form of Wi-Fi packets including frames conforming to an IEEE 802.11 wireless communication protocol standard such as that defined by the IEEE 802.11-2016 specification or amendments thereof including, but not limited to, 802.11ay, 802.11ax, 802.11az, 802.11ba and 802.11be) to and from one another via P2P wireless links 225 (e.g., NAN links) using a data packet routing protocol, such as Hybrid Wireless Mesh Protocol (HWMP), for path selection.

A NAN network generally refers to a collection of NAN devices 215 that share a common set of NAN parameters including: the time period between consecutive discovery windows, the time duration of the discovery windows, the NAN beacon interval, and the NAN discovery channel(s). A NAN ID refers to an identifier signifying a specific set of NAN parameters for use within the NAN network. NAN networks are dynamically self-organized and self-configured. NAN devices 215 in the network automatically establish an ad-hoc network with other NAN devices 215 such that network connectivity can be maintained. Each NAN device 215 is configured to relay data for the NAN network such that various NAN devices 215 may cooperate in the distribution of data within the network. As a result, a message can be transmitted from a source NAN device to a destination NAN device by being propagated along a path, hopping from one NAN device to the next until the destination is reached.

Each NAN device 215 may be configured to transmit two types of beacons: NAN discovery beacons and NAN synchronization beacons. In examples in which a NAN device 215 is turned on, or otherwise in examples in which NAN-functionality is enabled, the NAN device may periodically transmit NAN discovery beacons (for example, every 100 timing unites (TU)s (where one TU is 1024 microseconds), every 128 TUs or another suitable period) and NAN synchronization beacons (for example, every 512 TUs or another suitable period). Discovery beacons are management frames, transmitted between discovery windows, used to facilitate the discovery of NAN clusters. A NAN cluster is a collection of NAN devices within a NAN network that are synchronized to the same clock and discovery window schedule using a time synchronization function (TSF). To join NAN clusters, NAN devices 215 passively scan for discovery beacons from other NAN devices. In examples in which two NAN devices 215 come within a transmission range of one another, they will discover each other based on such discovery beacons. Respective master preference values determine which of the NAN devices 215 will become the master device. If a NAN cluster is not discovered, a NAN device 215 may start a new NAN cluster. In examples in which a NAN device 215 starts a NAN cluster, the NAN device 215 assumes the master role and broadcasts a discovery beacon. Additionally, a NAN device 215 may choose to participate in more than one NAN cluster within a NAN network.

The P2P wireless links 225 between the NAN devices 215 in a NAN cluster may be associated with discovery windows—the times and channel on which the NAN devices 215 converge. At the beginning of each discovery window, one or more NAN devices 215 may transmit a NAN synchronization beacon, which is a management frame used to synchronize the timing of the NAN devices 215 within the NAN cluster to that of the master device. The NAN devices 215 may then transmit multicast or unicast NAN SDFs directly to other NAN devices 215 within the service discovery threshold and in the same NAN cluster during the discovery window. The SDFs may indicate services supported by the respective NAN devices 215. In some aspects, pairing support may be advertised by NAN devices 215 in the SDF or beacons as part of an extended device capability information element (IE).

Some NAN devices 215 also may be configured for wireless communication with other networks such as with a Wi-Fi WLAN or a wireless (for example, cellular) wide area network (WWAN), which may, in turn, provide access to external networks including the Internet. For example, a NAN device 215 may be configured to associate and communicate, via a Wi-Fi or cellular link (wireless link 120-a), with an AP 105-a or base station of a WLAN or WWAN network, respectively. In such examples, the NAN device 215 may include SoftAP functionality enabling the STA to operate as a Wi-Fi hotspot to provide other NAN devices 215 with access to the external networks via the associated WLAN or WWAN backhaul. Such a NAN device 215 (referred to as a NAN concurrent device) is capable of operating in both a NAN network as well as another type of wireless network, such as a Wi-Fi BSS. In some such implementations, a NAN device 215 may, in an SDF, advertise an ability to provide such AP services to other NAN devices 215.

There are two general NAN service discovery messages: publish messages and subscribe messages. Generally, publishing is a mechanism for an application on a NAN device 215 to make selected information about the capabilities and services of the NAN device 215 available to other NAN devices 215, while subscribing is a mechanism for an application on a NAN device 215 to gather selected types of information about the capabilities and services of other NAN devices 215. A NAN device 215 may generate and transmit a subscribe message when requesting other NAN devices 215 operating within the same NAN cluster to provide a specific service. For example, in an active subscriber mode, a subscribe function executing within the NAN device 215 may transmit a NAN SDF to actively seek the availability of specific services. A publish function executing within a publishing NAN device 215 capable of providing a requested service may, for example, transmit a publish message to reply to the subscribing NAN device responsive to the satisfaction of criteria specified in the subscribe message. The publish message 215 may include a range parameter indicating the service discovery threshold, which represents the maximum distance at which a subscribing NAN device 215 can avail itself of the services of the publishing NAN device 215. A NAN device 215 also may use a publish message in an unsolicited manner, for example, a publishing NAN device 215 may generate and transmit a publish message to make its services discoverable for other NAN devices 215 operating within the same NAN cluster. In a passive subscriber mode, the subscribe function does not initiate the transfer of any subscribe message, rather, the subscribe function looks for matches in received publish messages to determine the availability of desired services.

Subsequent to a discovery window is a transmission opportunity period. This period includes numerous resource blocks. A NAN device link (NDL) refers to the negotiated resource blocks between NAN devices 215 used for NAN operations. An NDL can include more than one "hop." The quantity of hops depends on the quantity of devices between the device providing the service and the device consuming or subscribing to the service. An example of an NDL that includes two hops includes three NAN devices 215: the provider, the subscriber and a proxy to relay the information between the provider and the subscriber. In such a configuration, the first hop refers to the communication of information between the provider and the proxy, and the second hop refers to the communication of the information between the proxy and the subscriber. An NDL may refer to a subset of NAN devices 215 capable of one-hop service discovery, but an NDL also may be capable of service discovery and subscription over multiple hops (a multi-hop NDL).

There are two general NDL types: paged NDL (P-NDL) and synchronized NDL (S-NDL). Each common resource block (CRB) of a P-NDL includes a paging window (PW) followed by a transmission window (TxW). All NAN devices participating in a P-NDL operate in a state to receive frames during the paging window. Generally, the participating NAN devices 215 wake up during the paging window to listen on the paging channel to determine whether there is any traffic buffered for the respective devices. For example, a NAN device 215 that has pending data for transmission to another NAN device 215 may transmit a traffic announcement message to the other NAN device 215 during the paging window to inform the other NAN device 215 of the buffered data. If there is data available, the NAN device 215 remains awake during the transmission window to exchange the data. If there is no data to send, the NAN device 215 may transition back to a sleep state during the transmission window to conserve power. A NAN device 215 transmits a paging message to its NDL peer during a paging window if it has buffered data available for the peer. The paging message includes, for example, the MAC addresses or identifiers of the destination devices for which data is available. A NAN device 215 that is listed as a recipient in a received paging message transmits a trigger frame to the transmitting device and remains awake during the subsequent transmission window to receive the data. The NDL transmitter device transmits the buffered data during the transmission window to the recipient devices from whom it received a trigger frame. A NAN device 215 that establishes an S-NDL with a peer NAN device 215 may transmit data frames to the peer from the beginning of each S-NDL CRB without transmitting a paging message in advance.

Figure 3:
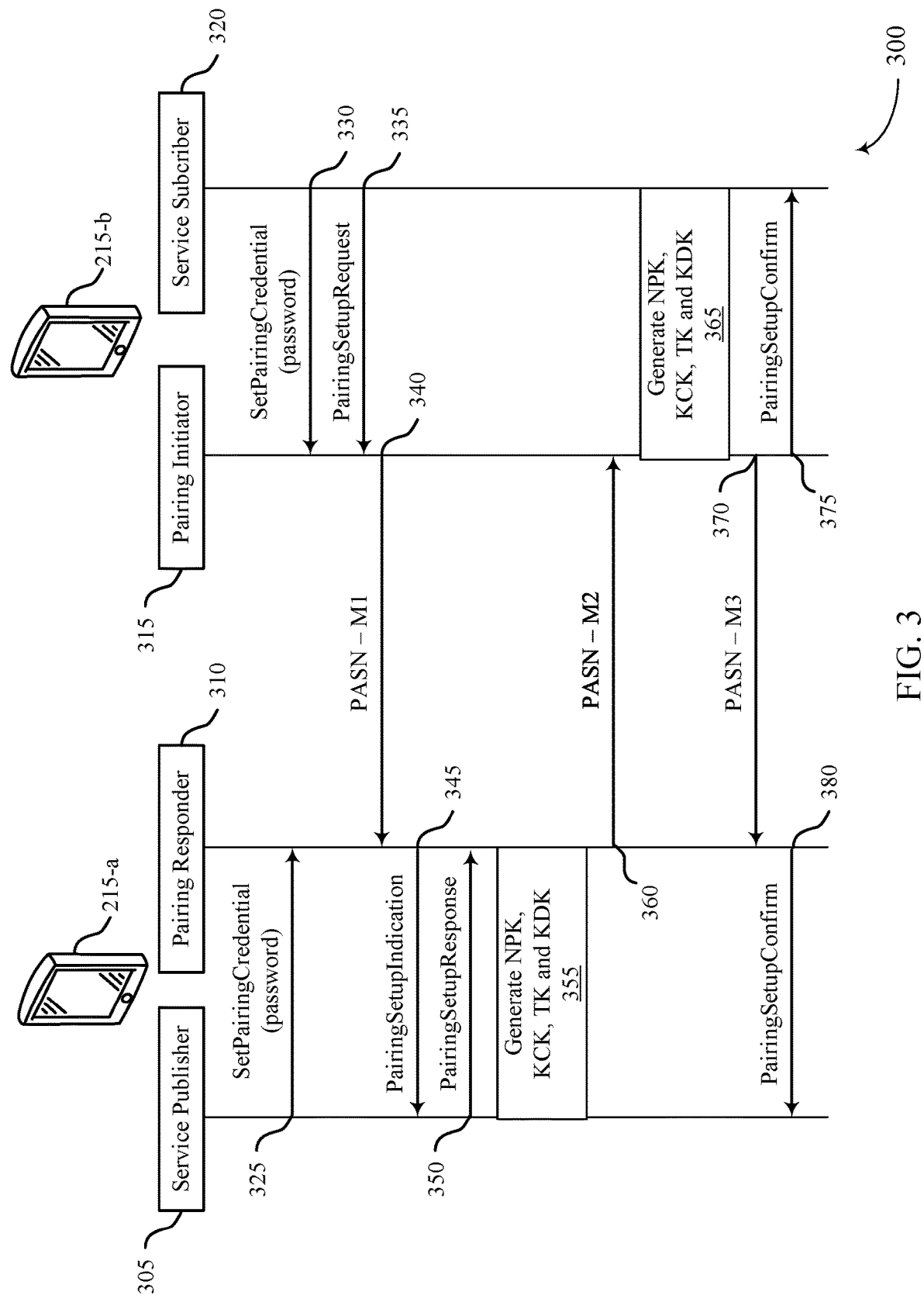
FIG. 3 illustrates an example of a process flow that supports NAN pairing termination in accordance with one or more aspects of the present disclosure.

FIG. 3 illustrates an example of a process flow 300 that supports NAN pairing termination in accordance with one or more aspects of the present disclosure. The process flow 300 may implement or be implemented by one or more aspects of the WLAN 100 or the WLAN 200. For example, the process flow may include a first NAN device 215-*a* and a second NAN device 215-*b*, which may be an example of a NAN device 215 described herein. The process flow 300 may show NAN communications between the first NAN device 215-*a* and the second NAN device 215-*b* (for example, NAN peers) in a NAN network as described with reference to WLAN 100 or WLAN 200. In the following description of the process flow 300, the operations between the first NAN device 215-*a* and the second NAN device 215-*b* may be transmitted in a different order than the example order shown, or the operations performed by the first NAN device 215-*a* and the second NAN device 215-*b* may be performed in different orders or at different times. Some operations may also be omitted from the process flow 300, and other operations may be added to the process flow 300.

The process flow 300 illustrates a NAN device pairing protocol for the first NAN device 215-*a* and the second NAN device 215-*b* to authenticate each other when setting up a pairing relationship using a credential (e.g., a password). The pairing protocol may be specified by the Wi-Fi Alliance (WFA) NAN standard specification. In some examples, the first NAN device 215-*a* may include a service publisher 305 and a pairing responder 310, and the second NAN device 215-*b* may include a pairing initiator 315 and a service subscriber 320. In some examples, the NAN pairing protocol may include a discovery and pairing bootstrapping technique to enable the first NAN device 215-*a* and the second NAN device 215-*b* to possess a same pairing credential. The pairing initiator 315 may initiate the pairing setup with the pairing responder 310 to authenticate each other by proving possession of a credential (e.g., a password). For example, at 325, the service publisher 305 may send a SetPairingCredential message (e.g., including the password) to the pairing responder 310. At 330, the service subscriber 320 may send the SetPairingCredential message (e.g., including the password) to the pairing initiator 315. At 335, the service subscriber 320 may send a PairingSetupRequest message to the pairing initiator 315.

In some examples, the password-authenticated NAN pairing setup employs preassociation security negotiation (PASN) authentication with simultaneous authentication of equals (SAE) tunneling. At 340, the pairing initiator 315 may send a first PASN authentication frame (PASN-M1) to the pairing responder 310. The first PASN authentication frame may include a robust security network element (RSNE)<SAE>, a robust security network extension element (RSNXE)<hash to element (H2E)>, a NAN IE<device capability extension attribute (DCEA), cipher suite information attribute (CSIA), NAN pairing bootstrapping attribute (NPBA)>, PASN parameters and wrapped data <SAE comments>. At 345, the pairing responder 310 may send a PairingSetupIndication message to the service publisher 305. At 350, the service publisher 305 may send a PairingSetupResponse message to the pairing responder 310. At 355, the first NAN device 215-*a* may generate a NAN pairing key (NPK), a key confirmation key (KCK), a temporal key (TK) and a key distribution key (KDK). At 360, the pairing responder 310 may send a second PASN authentication frame to the pairing initiator 315. The second PASN authentication frame may include a RSNE <SAE>, a RSNXE <H2E>, a NAN IE<DCEA, CSIA, NPBA>, PASN parameters and wrapped data <SAE comment & confirms>, a message integrity code (MIC).

At 365, the second NAN device 215-*b* may generate the NPK, KCK, TK and KDK. At 370, the pairing initiator 315 may send a third PASN authentication frame to the pairing responder 310. The third PASN authentication frame may include status code, PASN parameters and wrapped data <SAE confirm>, and a MIC. At 375, the pairing initiator 315 may send a PairingSetupConfirm message to the service subscriber 320. At 380, the pairing responder 310 may send the PairingSetupConfirm message to the service publisher 305. After successful completion of the pairing setup protocol, a NAN pairing key security association (NPKSA) may be established between the first NAN device 215-*a* and the second NAN device 215-*b*. The NPKSA may contain a NAN pairing key identifier (NPKID) that identifies the security association, a local NAN identification key (NIK) and a peer's NIK, if the NAN pairing key (NPK)/NIK caching is enabled, a base authentication and key management (AKM) (SAE or PASN Opportunistic Pairing) used to establish the security association, a cipher suite agreed upon and identified by a cipher suite identifier (CSID), a shared symmetric key (SSK) and a lifetime for the pairing. Once the first NAN device 215-*a* and the second NAN device 215-*b* are authenticated, communications between the first NAN device 215-*a* and the second NAN device 215-*b* may be secured using the derived TK. In some examples, group protection may be enabled using an integrity group transient key (IGTK) used to protect multicast management frames and a beacon integrity group temporal key (BIGTK).

Figure 4:
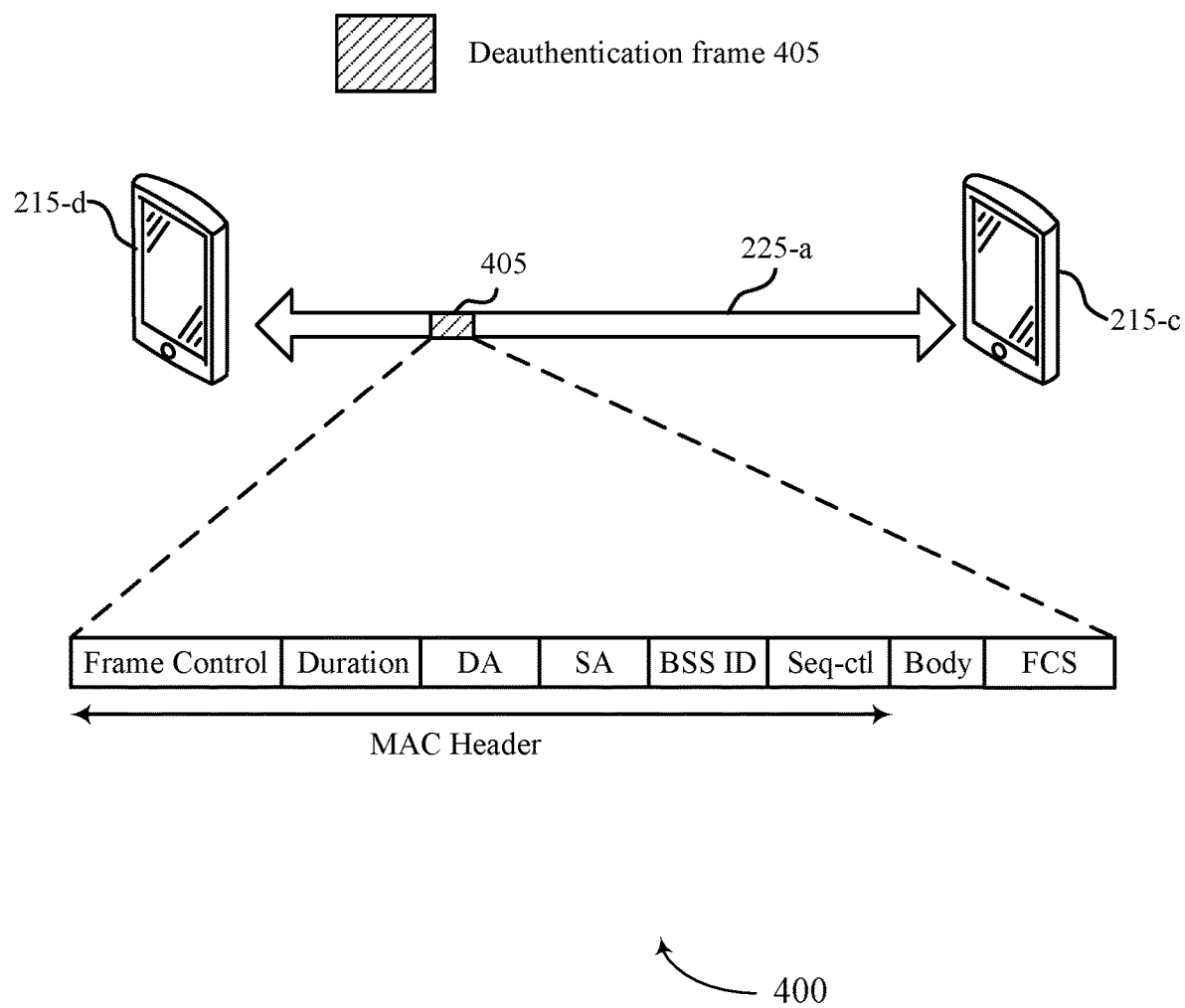
FIG. 4 illustrates an example of a WLAN that supports NAN pairing termination in accordance with one or more aspects of the present disclosure.

FIG. 4 illustrates an example of a WLAN 400 that supports NAN pairing termination in accordance with one or more aspects of the present disclosure. The WLAN 400 may implement or be implemented by one or more aspects of the WLAN 100 or the WLAN 200. For example, the WLAN 400 may include a first NAN device 215-*c* and a second NAN device 215-*d*, which may be examples of NAN devices 215 described herein. The WLAN 400 may represent NAN communications between the first NAN device 215-*c* and the second NAN device 215-*d* that have established a pairing session using a credential (e.g., password) as described with reference to FIG. 3.

In some examples, after the NAN pairing session is initiated, the first NAN device 215-*c* may terminate the pairing session with the second NAN device 215-*d*. For example, the first NAN device 215-*c* may experience resource exhaustion or interface down or other reasons for terminating. As another example, an end user of a first NAN device 215-*c* may wish to terminate a NAN pairing session with the second NAN device 215-*d*, and an ability to allow an end user to terminate a NAN pairing session on demand may provide a better user experience than a NAN pairing session where an end user in unable to terminate the NAN pairing session on demand. The first NAN device 215-*c* may deauthenticate or terminate the pairing session with the second NAN device 215-*d* and remove the existing key resources. In some examples, if the first NAN device 215-*c* removes the keys without informing the second NAN device 215-*d*, a decryption error and information loss may occur, which may result in poor user experience.

In some examples, the first NAN device 215-*c* may transmit a deauthentication frame 405 to the second NAN device 215-*d* via a communication channel 225-*a* (e.g., a NAN data path) to terminate the pairing session. As illustrated in the example of FIG. 4, the deauthentication frame 405 may be a IEE802.11 deauthentication frame. The deauthentication frame 405 may include frame control information, a duration field, a destination address (DA), a source address (SA), a basic service set identifier (BSSID), sequence control information, a body, and a frame check sequence (FCS). The frame control information and the duration field may each include 2 bytes; the DA, SA, and BSSID may each include 6 bytes; and the FCS may include 4 bytes. In some examples, the DA may be the NAN Management Interface address (NMI) of the receiver (second NAN device 215-*d*), the SA may be the NMI of the sender (the first NAN device 215-*c*), and the BSS ID may be the NAN cluster identifier. The frame body of the deauthentication frame 405 may include a reason code (2 bytes), vendor specific information (one or more) and 802.11w management frame protection (MFP) information. In some examples, the reason code may indicate the reason for terminating the pairing session. In some examples, the second NAN device 215-*d* may inform an end user of the second NAN device 215-*d* of the reason code (e.g., via a user interface). In some examples, the deauthentication frame 405 may be protected using the keys derived during the pairing authentication. In some examples, the deauthentication frame 405 may be secured using the authentication key(s) for NAN communications derived during the authentication pairing protocol. In some examples, the deauthentication frame 405 may not include any NAN device specific IEs, as the NAN devices may interpret and consume the deauthentication frame 405 based on the NMI address.

In some examples, after the first NAN device 215-*c* transmits the deauthentication frame 405, the second NAN device 215-*d* may receive the deauthentication frame 405 and may send an acknowledgment message to the first NAN device 215-*c* in response to the deauthentication frame 405. In some examples, the first NAN device 215-*c* may terminate the pairing session with the second NAN device 215-*d* after receiving the acknowledgment message or after transmitting the deauthentication frame 405. When the first NAN device 215-*c* terminates the pairing session, the first NAN device 215-*c* may delete the PASN pairwise transient key security association (PTKSA) (the keys derived during the pairing authentication). In some examples, the second NAN device 215-*d* may receive the deauthentication frame 405 and may terminate the pairing session without sending the acknowledgment message to the first NAN device 215-*c*. When the second NAN device 215-*d* terminates the pairing session, the second NAN device 215-*d* may delete the PASN PTKSA (the keys derived during the pairing authentication). Once the NAN pairing session is terminated, the first NAN device 215-*c* and the second NAN device 215-*d* may no longer send each other encrypted packets using NMI. The first NAN device 215-*c* and the second NAN device 215-*d* may reauthenticate and initiate another NAN pairing session using the protocol of FIG. 3.

Figure 5:
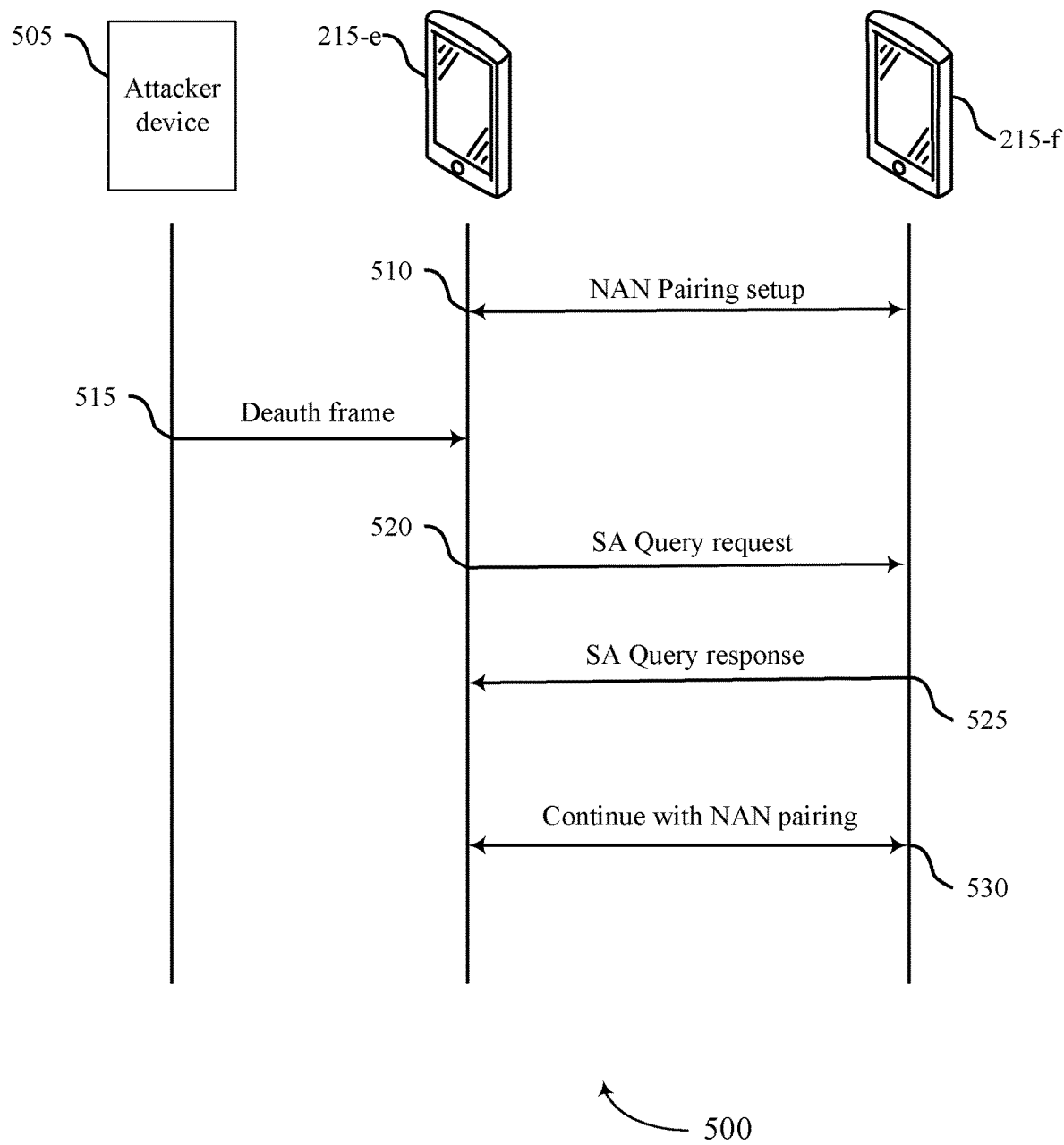
FIG. 5 illustrates an example of a process flow that supports NAN pairing termination in accordance with one or more aspects of the present disclosure.

In some examples, the first NAN device 215-*c* may establish the authenticated NAN pairing session with multiple other NAN devices in a NAN cluster. In this example, the first NAN device 215-*c* may terminate the NAN pairing session with the multiple other NAN devices by transmitting a multicast deauthentication frame that is addressed to all of the NAN devices in the NAN cluster. For the multicast deauthentication frame, the address 1 (A1) field of the MAC header may contain the NAN cluster identifier (ID). The first NAN device 215-*c* (sender NAN device) may supply a Management Mic IE (MMIE) if the first NAN device 215-*c* supports IGTK and the devices have exchanged IGTK key data encapsulation (KDE) after establishing a pairing session. In some aspects, once a pairing session is established, NAN devices may exchange IGTK and BIGTK keys through NAN follow up messages encrypted using a TK. The NAN devices receiving the multicast deauthentication frame may perform an integrity check with the IGTK keys received from the sender NAN device. In some examples, one of the NAN devices in the NAN cluster may not support the IGTK keys and a security association (SA) query procedure may be used as illustrated in FIG. 5. In some examples, the deauthentication procedure may prevent packet retries and information loss for terminated session freeing up resources, and protect against denial of service attacks.

FIG. 5 illustrates an example of a process flow 500 that supports NAN pairing termination in accordance with one or more aspects of the present disclosure. The process flow 500 may implement or be implemented by one or more aspects of the WLAN 100, the WLAN 200, or the WLAN 400. For example, the process flow 500 may include a first NAN device 215-*e* and a second NAN device 215-*f*, which may be examples of NAN devices 215 described herein. For example, the process flow 500 may represent NAN communications between a first NAN device 215-*e* and a second NAN device 215-*f* (for example, NAN peers) in a NAN network as described with reference to FIGS. 2 and 4. In the following description of the process flow 500, the operations between the first NAN device 215-*e*, the second NAN device 215-*f*, and an attacker device 505 may be transmitted in a different order than the example order shown, or the operations performed by the first NAN device 215-*e*, the second NAN device 215-*f*, and the attacker device 505 be performed in different orders or at different times. Some operations may also be omitted from the process flow 500, and other operations may be added to the process flow 500.

The process flow 500 illustrates a security association query procedure to protect against a deauthentication attack in an authenticated NAN pairing session. In some examples, an attacker device 505 may attempt a deauthentication attack by spoofing the NMI of any paired NAN device 215. At 510, the first NAN device 215-*e* and the second NAN device 215-*f* may initiate an authenticated NAN pairing session using the NAN pairing protocol, for example as illustrated in FIG. 3. At 515, the attacker device 505 may transmit a deauthentication frame to the first NAN device 215-*e*. In some examples, the attacker device may spoof the NMI of the second NAN device 215-*f*, and the deauthentication frame field SA may contain the NMI address of the second NAN device 215-*f* identifying the second NAN device 215-*f* as the sender of the deauthentication frame.

At 520, in response to the deauthentication frame, the first NAN device 215-*e* may transmit a security association query to the device (second NAN device 215-*f*) indicated as the sender of the deauthentication frame. At 525, the second NAN device 215-*f* may transmit a security association response to the first NAN device 215-*e*. At 530, as the first NAN device 215-*e* received the security association response, the first NAN device 215-*e* may ignore the deauthentication frame from the attacker device, and the first NAN device 215-*e* and second NAN device 215-*f* may continue with the NAN pairing session. If the first NAN device 215-*e* does not receive the security association response, the first NAN device 215-*e* may terminate the NAN pairing session and remove the existing key resources.

Figure 6:
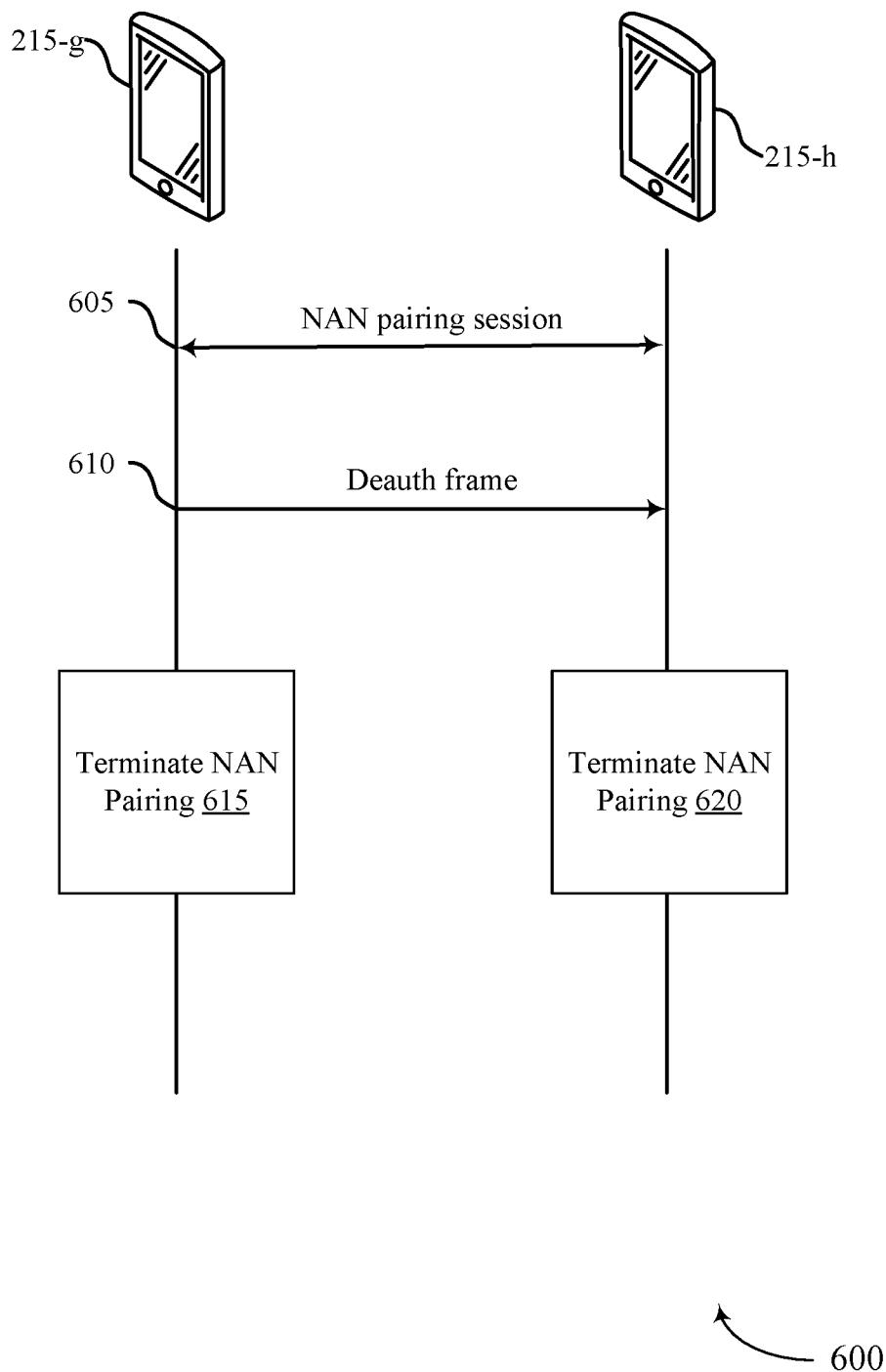
FIG. 6 illustrates an example of a process flow that supports NAN pairing termination in accordance with one or more aspects of the present disclosure.

FIG. 6 illustrates an example of a process flow 600 that supports NAN pairing termination in accordance with one or more aspects of the present disclosure. The process flow may include a first NAN device 215-*g* and a second NAN device 215-*h*, which may be an example of a NAN device 215 described herein. In the following description of the process flow 600, the operations between the first NAN device 215-*g* and the second NAN device 215-*h* may be transmitted in a different order than the example order shown, or the operations performed by the first NAN device 215-*g* and the second NAN device 215-*h* may be performed in different orders or at different times. Some operations may also be omitted from the process flow 600, and other operations may be added to the process flow 600.

At 605, the first NAN device 215-*g* and the second NAN device 215-*h* may initiate a NAN pairing session. At 610, the first NAN device 215-*g* may transmit a deauthentication frame to the second NAN device 215-*h*. At 615, the first NAN device 215-*g* may terminate the NAN pairing session in response to transmitting the deauthentication frame. Additionally, or alternatively, the first NAN device 215-*g* may terminate the NAN pairing session based on or in response to determining to transmit the deauthentication frame or determining to terminate the NAN pairing session. For example, the first NAN device 215-*g* may determine to terminate the NAN pairing session and then both transmit the deauthentication frame and terminate the NAN pairing session in response to determining to terminate the NAN pairing session. In some examples, the first NAN device 315-*g* may terminate the NAN pairing session before, simultaneous with, or after transmitting the deauthentication frame. At 620, the second NAN device 215-*h* may terminate the NAN pairing session in response to or based on receiving the deauthentication frame.

In some examples, to terminate the NAN pairing session, the first NAN device 215-*g* or the second NAN device 215-*h* may remove an authentication key for communications in the NAN pairing session. In some examples, the first NAN device 215-*g* or the second NAN device 215-*h* may derive the authentication key for communications in the NAN pairing session (e.g., at 605), and may remove the authentication key at 615 and 620. In some examples, the first NAN device 215-*g* may encrypt the deauthentication frame using the authentication key, and the second NAN device 215-*h* may decrypt the deauthentication frame using the authentication key.

In some examples, the second NAN device 215-*h* may transmit, and the first NAN device 215-*g* may receive, an acknowledgment message in response to the deauthentication frame. In some examples, the first NAN device 215-*g* may terminate the NAN pairing session at 615 in response to the acknowledgment message, In some examples, the first NAN device 215-*g* may unicast the deauthentication frame to the second NAN device 215-*h*. In some examples, the first NAN device 215-*g* may multicast the deauthentication frame to the second NAN device 215-*h* and a third NAN device.

In some examples, the deauthentication frame may include a header indicating an interface address of the first NAN device 215-*g* and an interface address of the second NAN device 215-*h*. In some examples, the deauthentication frame may include a field indicating a reason for terminating the pairing session. In some examples, the deauthentication frame may include a header indicating a first interface address of the first NAN device 215-*g* and an identifier associated with a NAN cluster including the first NAN device 215-*g*, the second NAN device 215-*h*, and a third NAN device. In some examples, the first NAN device 215-*g* transmits the deauthentication frame in accordance with a group authentication key common to the first NAN device 215-*g*, the second NAN device 215-*h*, and the third NAN device.

In some examples, the first NAN device 215-*g* may receive a security association query message from the second NAN device 215-*h* in response to the deauthentication frame, and the first NAN device 215-*g* may refrain from transmitting a response to the security association query message as the first NAN device 215-*g* transmitted the deauthentication frame at 610. Accordingly, the first NAN device 215-*g* and the second NAN device 215-*h* may terminate the NAN pairing session at 615 and 620.

In some examples, the first NAN device 215-*g* may receive a security association query message from the second NAN device 215-*h* (e.g., prior to transmitting the deauthentication frame at 610). For example, the second NAN device 215-*h* may receive a deauthentication attack from another wireless device imitating the first NAN device 215-*g*. The first NAN device 215-*g* may transmit a security association response message to the second NAN device 215-*h* in response to the security association query message, and the first NAN device 215-*g* and the second NAN device 215-*h* may continue the NAN pairing session.

Figure 7:
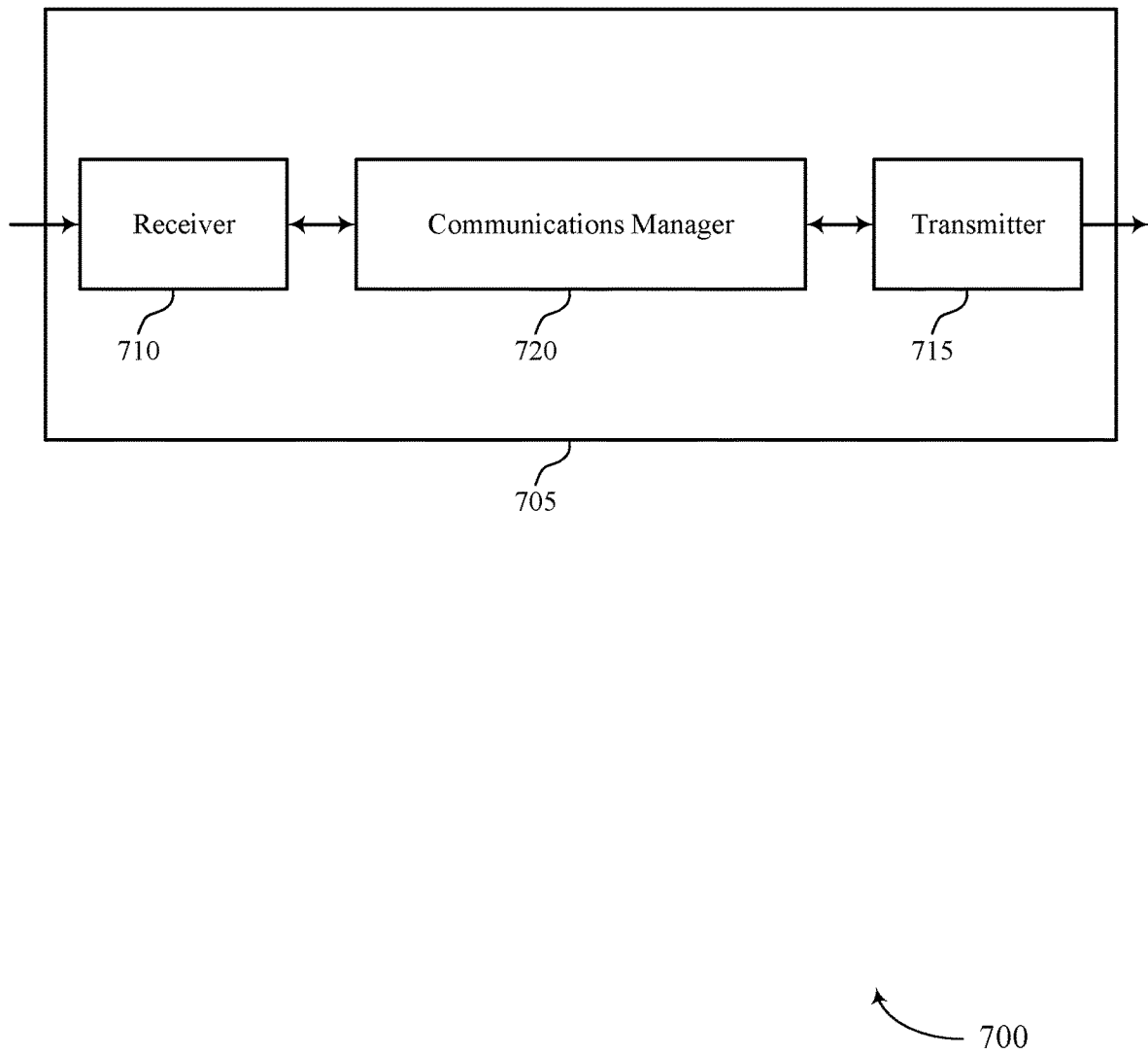
FIGS. 7 and 8 show block diagrams of devices that support NAN pairing termination in accordance with one or more aspects of the present disclosure.

FIG. 7 shows a block diagram 700 of a device 705 that supports NAN pairing termination in accordance with one or more aspects of the present disclosure. The device 705 may be an example of aspects of an STA as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to NAN pairing termination). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to NAN pairing termination). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of NAN pairing termination as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications at a first wireless device in accordance with examples as disclosed herein. For example, the communications manager 720 may be configured as or otherwise support a means for communicating with a second wireless device using a NAN protocol to initiate a pairing session between the first wireless device and the second wireless device. The communications manager 720 may be configured as or otherwise support a means for transmitting, to the second wireless device, a deauthentication frame indicating to end the pairing session. The communications manager 720 may be configured as or otherwise support a means for terminating the pairing session with the second wireless device in response to transmitting the deauthentication frame.

Additionally, or alternatively, the communications manager 720 may support wireless communications at a second wireless device in accordance with examples as disclosed herein. For example, the communications manager 720 may be configured as or otherwise support a means for communicating with a first wireless device using a NAN protocol to initiate a pairing session between the first wireless device and the second wireless device. The communications manager 720 may be configured as or otherwise support a means for receiving, from the first wireless device, a deauthentication frame indicating to end the pairing session. The communications manager 720 may be configured as or otherwise support a means for terminating the pairing session with the first wireless device in response to receiving the deauthentication frame.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for reducing processing and more efficient utilization of the communication resources.

Figure 8:
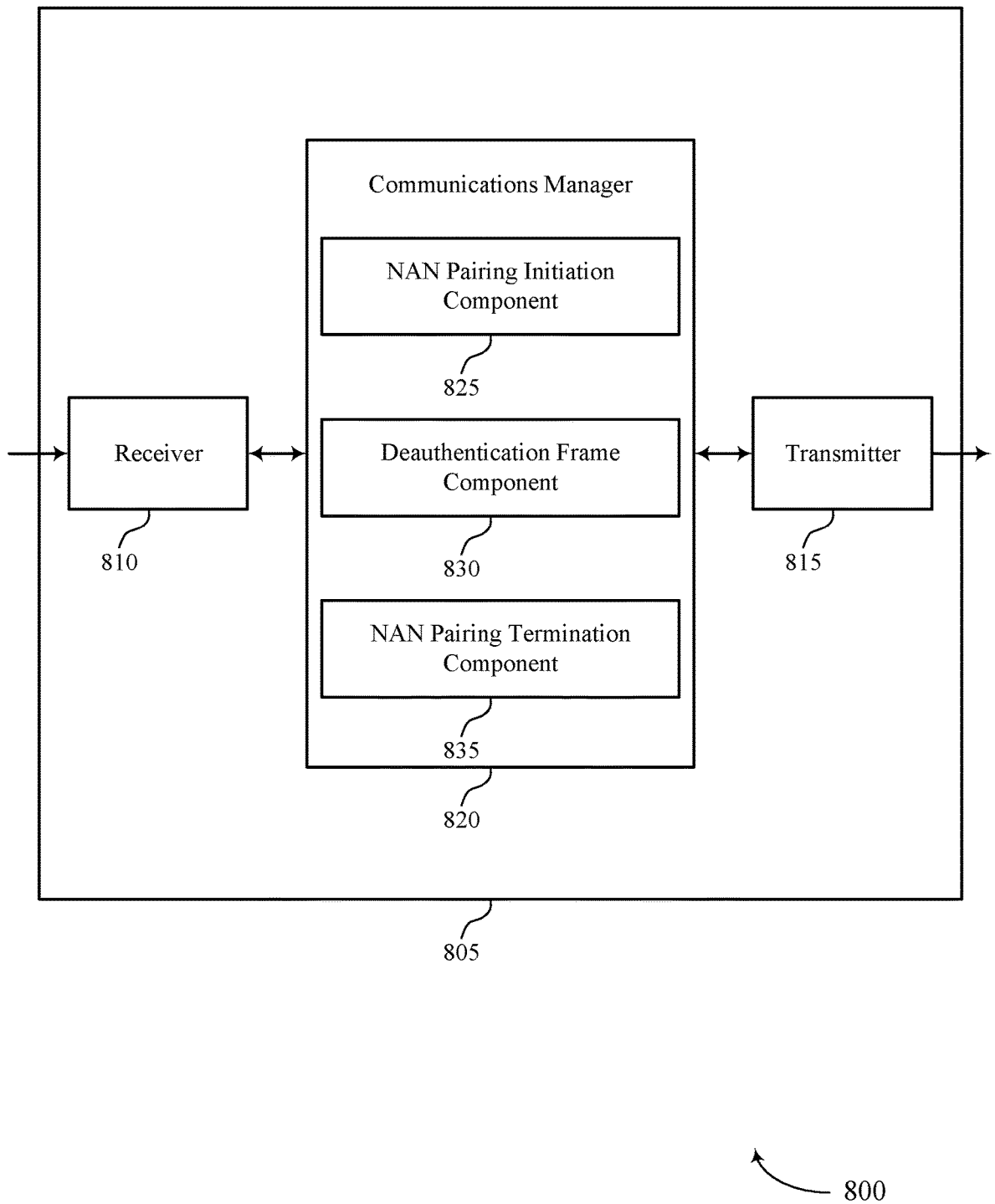

FIG. 8 shows a block diagram 800 of a device 805 that supports NAN pairing termination in accordance with one or more aspects of the present disclosure. The device 805 may be an example of aspects of a device 705 or an STA 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to NAN pairing termination). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to NAN pairing termination). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of NAN pairing termination as described herein. For example, the communications manager 820 may include a NAN pairing initiation component 825, a deauthentication frame component 830, a NAN pairing termination component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communications at a first wireless device in accordance with examples as disclosed herein. The NAN pairing initiation component 825 may be configured as or otherwise support a means for communicating with a second wireless device using a NAN protocol to initiate a pairing session between the first wireless device and the second wireless device. The deauthentication frame component 830 may be configured as or otherwise support a means for transmitting, to the second wireless device, a deauthentication frame indicating to end the pairing session. The NAN pairing termination component 835 may be configured as or otherwise support a means for terminating the pairing session with the second wireless device in response to transmitting the deauthentication frame.

Additionally, or alternatively, the communications manager 820 may support wireless communications at a second wireless device in accordance with examples as disclosed herein. The NAN pairing initiation component 825 may be configured as or otherwise support a means for communicating with a first wireless device using a NAN protocol to initiate a pairing session between the first wireless device and the second wireless device. The deauthentication frame component 830 may be configured as or otherwise support a means for receiving, from the first wireless device, a deauthentication frame indicating to end the pairing session. The NAN pairing termination component 835 may be configured as or otherwise support a means for terminating the pairing session with the first wireless device in response to receiving the deauthentication frame.

Figure 9:
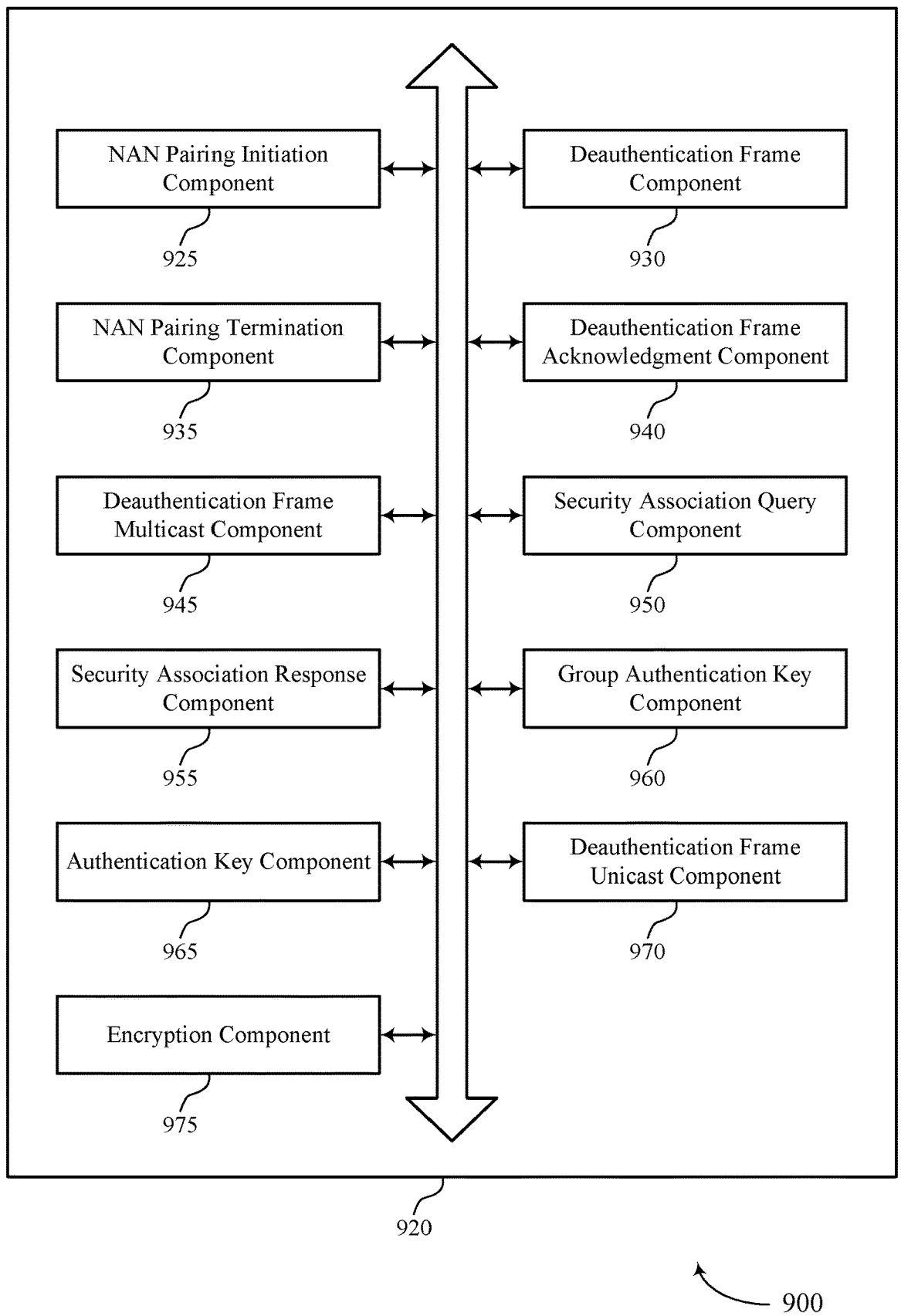
FIG. 9 shows a block diagram of a communications manager that supports NAN pairing termination in accordance with one or more aspects of the present disclosure.

FIG. 9 shows a block diagram 900 of a communications manager 920 that supports NAN pairing termination in accordance with one or more aspects of the present disclosure. The communications manager 920 may be an example of aspects of a communications manager 720, a communications manager 820, or both, as described herein. The communications manager 920, or various components thereof, may be an example of means for performing various aspects of NAN pairing termination as described herein. For example, the communications manager 920 may include a NAN pairing initiation component 925, a deauthentication frame component 930, a NAN pairing termination component 935, a deauthentication frame acknowledgment component 940, a deauthentication frame multicast component 945, a security association query component 950, a security association response component 955, a group authentication key component 960, an authentication key component 965, a deauthentication frame unicast component 970, an encryption component 975, or any combination thereof. Each of these components may communicate, directly or indirectly, with one another (e.g., via one or more buses).

The communications manager 920 may support wireless communications at a first wireless device in accordance with examples as disclosed herein. The NAN pairing initiation component 925 may be configured as or otherwise support a means for communicating with a second wireless device using a NAN protocol to initiate a pairing session between the first wireless device and the second wireless device. The deauthentication frame component 930 may be configured as or otherwise support a means for transmitting, to the second wireless device, a deauthentication frame indicating to end the pairing session. The NAN pairing termination component 935 may be configured as or otherwise support a means for terminating the pairing session with the second wireless device in response to transmitting the deauthentication frame.

In some examples, terminating the pairing session includes removing an authentication key for communication between the first wireless device and the second wireless device.

In some examples, the authentication key component 965 may be configured as or otherwise support a means for deriving, based on the pairing session, the authentication key.

In some examples, the encryption component 975 may be configured as or otherwise support a means for encrypting the deauthentication frame using the authentication key.

In some examples, the deauthentication frame acknowledgment component 940 may be configured as or otherwise support a means for receiving, from the second wireless device, an acknowledgment message in response to the deauthentication frame.

In some examples, to support transmitting the deauthentication frame, the deauthentication frame unicast component 970 may be configured as or otherwise support a means for unicasting the deauthentication frame to the second wireless device.

In some examples, the deauthentication frame includes a header indicating a first interface address associated with the first wireless device and a second interface address associated with the second wireless device.

In some examples, the deauthentication frame includes a field indicating a reason for terminating the pairing session.

In some examples, to support transmitting the deauthentication frame, the deauthentication frame multicast component 945 may be configured as or otherwise support a means for multicasting the deauthentication frame to the second wireless device and a third wireless device.

In some examples, the deauthentication frame includes a header indicating a first interface address associated with the first wireless device and an identifier associated with a NAN cluster including the first wireless device, the second wireless device, and the third wireless device.

In some examples, to support transmitting the deauthentication frame, the group authentication key component 960 may be configured as or otherwise support a means for transmitting the deauthentication frame in accordance with a group authentication key common to the first wireless device, the second wireless device, and the third wireless device.

In some examples, the security association query component 950 may be configured as or otherwise support a means for receiving, from the second wireless device, a security association query message in response to the deauthentication frame. In some examples, the security association response component 955 may be configured as or otherwise support a means for refraining from transmitting a response to the security association query message.

In some examples, the security association query component 950 may be configured as or otherwise support a means for receiving, from the second wireless device, a security association query message. In some examples, the security association response component 955 may be configured as or otherwise support a means for transmitting, to the second wireless device, a security association response message key in response to the security association query message.

Additionally, or alternatively, the communications manager 920 may support wireless communications at a second wireless device in accordance with examples as disclosed herein. In some examples, the NAN pairing initiation component 925 may be configured as or otherwise support a means for communicating with a first wireless device using a NAN protocol to initiate a pairing session between the first wireless device and the second wireless device. In some examples, the deauthentication frame component 930 may be configured as or otherwise support a means for receiving, from the first wireless device, a deauthentication frame indicating to end the pairing session. In some examples, the NAN pairing termination component 935 may be configured as or otherwise support a means for terminating the pairing session with the first wireless device in response to receiving the deauthentication frame.

In some examples, terminating the pairing session includes removing an authentication key for communication between the first wireless device and the second wireless device.

In some examples, the authentication key component 965 may be configured as or otherwise support a means for deriving, based on the pairing session, the authentication key.

In some examples, the encryption component 975 may be configured as or otherwise support a means for decrypting the deauthentication frame using the authentication key.

In some examples, the deauthentication frame acknowledgment component 940 may be configured as or otherwise support a means for transmitting, to the first wireless device, an acknowledgment message in response to the deauthentication frame.

In some examples, the deauthentication frame includes a header indicating a first interface address associated with the first wireless device and a second interface address associated with the second wireless device.

In some examples, the deauthentication frame includes a field indicating a reason for terminating the pairing session.

In some examples, the deauthentication frame includes a header indicating a first interface address associated with the first wireless device and an identifier associated with a NAN cluster including the first wireless device, the second wireless device, and a third wireless device.

In some examples, to support receiving the deauthentication frame, the group authentication key component 960 may be configured as or otherwise support a means for receiving the deauthentication frame in accordance with a group authentication key common the first wireless device, the second wireless device, and a third wireless device.

In some examples, the security association query component 950 may be configured as or otherwise support a means for transmitting, to the first wireless device, a security association query message. In some examples, the security association response component 955 may be configured as or otherwise support a means for receiving, from the first wireless device, a security association response message key in response to the security association query message.

In some examples, the security association query component 950 may be configured as or otherwise support a means for transmitting, to the first wireless device, a security association query message in response to the deauthentication frame, where terminating the pairing session is based on an absence of a response from the first wireless device to the security association query message within a query timeout period.

Figure 10:
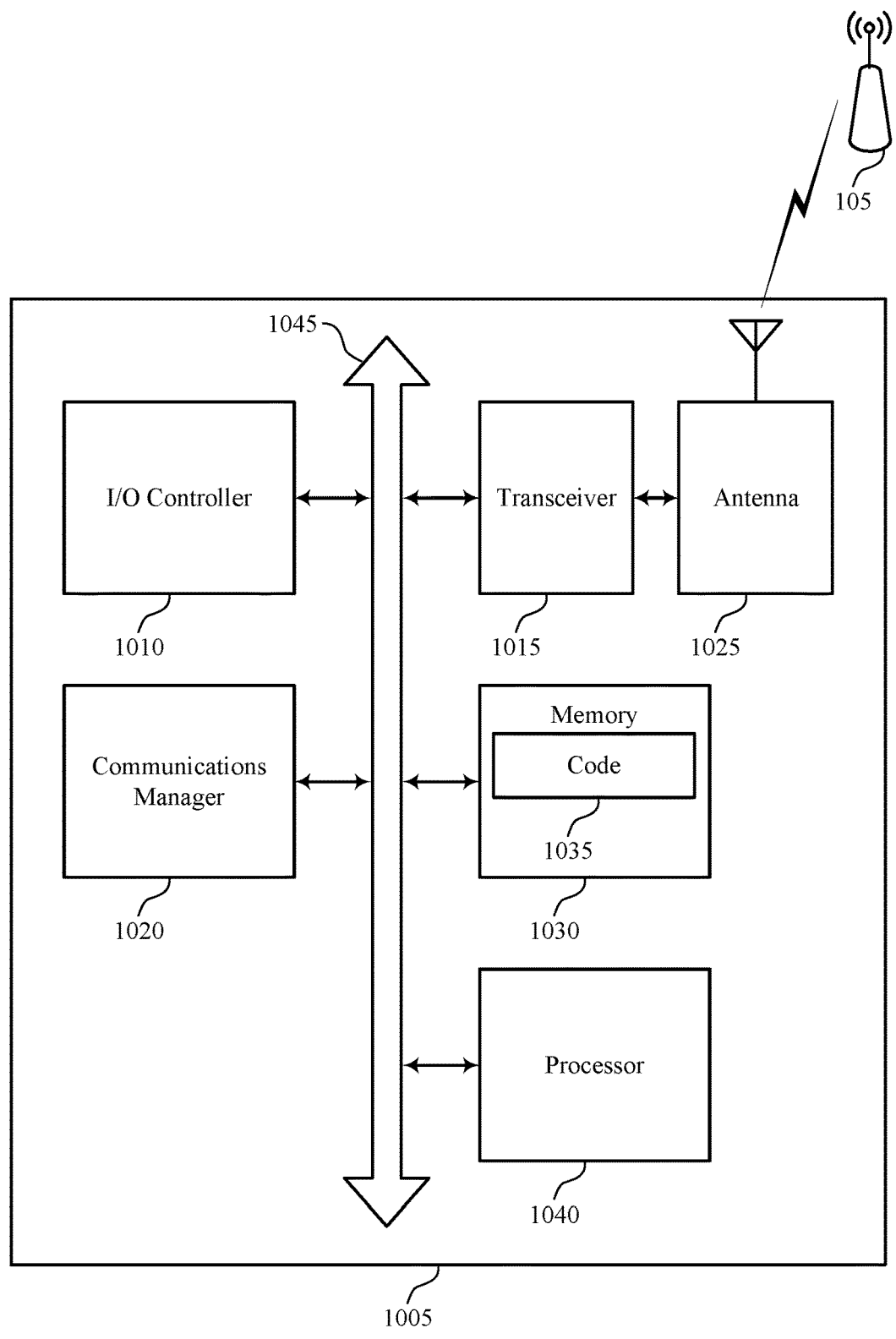
FIG. 10 shows a diagram of a system including a device that supports NAN pairing termination in accordance with one or more aspects of the present disclosure.

FIG. 10 shows a diagram of a system 1000 including a device 1005 that supports NAN pairing termination in accordance with one or more aspects of the present disclosure. The device 1005 may be an example of or include the components of a device 705, a device 805, or an STA as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. In some other cases, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets and provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. In some cases, the memory 1030 may contain, among other things, a basic I/O system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting NAN pairing termination). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first wireless device in accordance with examples as disclosed herein. For example, the communications manager 1020 may be configured as or otherwise support a means for communicating with a second wireless device using a NAN protocol to initiate a pairing session between the first wireless device and the second wireless device. The communications manager 1020 may be configured as or otherwise support a means for transmitting, to the second wireless device, a deauthentication frame indicating to end the pairing session. The communications manager 1020 may be configured as or otherwise support a means for terminating the pairing session with the second wireless device in response to transmitting the deauthentication frame.

Additionally, or alternatively, the communications manager 1020 may support wireless communications at a second wireless device in accordance with examples as disclosed herein. For example, the communications manager 1020 may be configured as or otherwise support a means for communicating with a first wireless device using a NAN protocol to initiate a pairing session between the first wireless device and the second wireless device. The communications manager 1020 may be configured as or otherwise support a means for receiving, from the first wireless device, a deauthentication frame indicating to end the pairing session. The communications manager 1020 may be configured as or otherwise support a means for terminating the pairing session with the first wireless device in response to receiving the deauthentication frame.

By including or configuring the communications manager 1020 in accordance with examples as described herein, the device 1005 may support techniques for improved communication reliability, improved user experience related to reduced processing, improved coordination between devices and improved utilization of processing capability.

Figure 11:
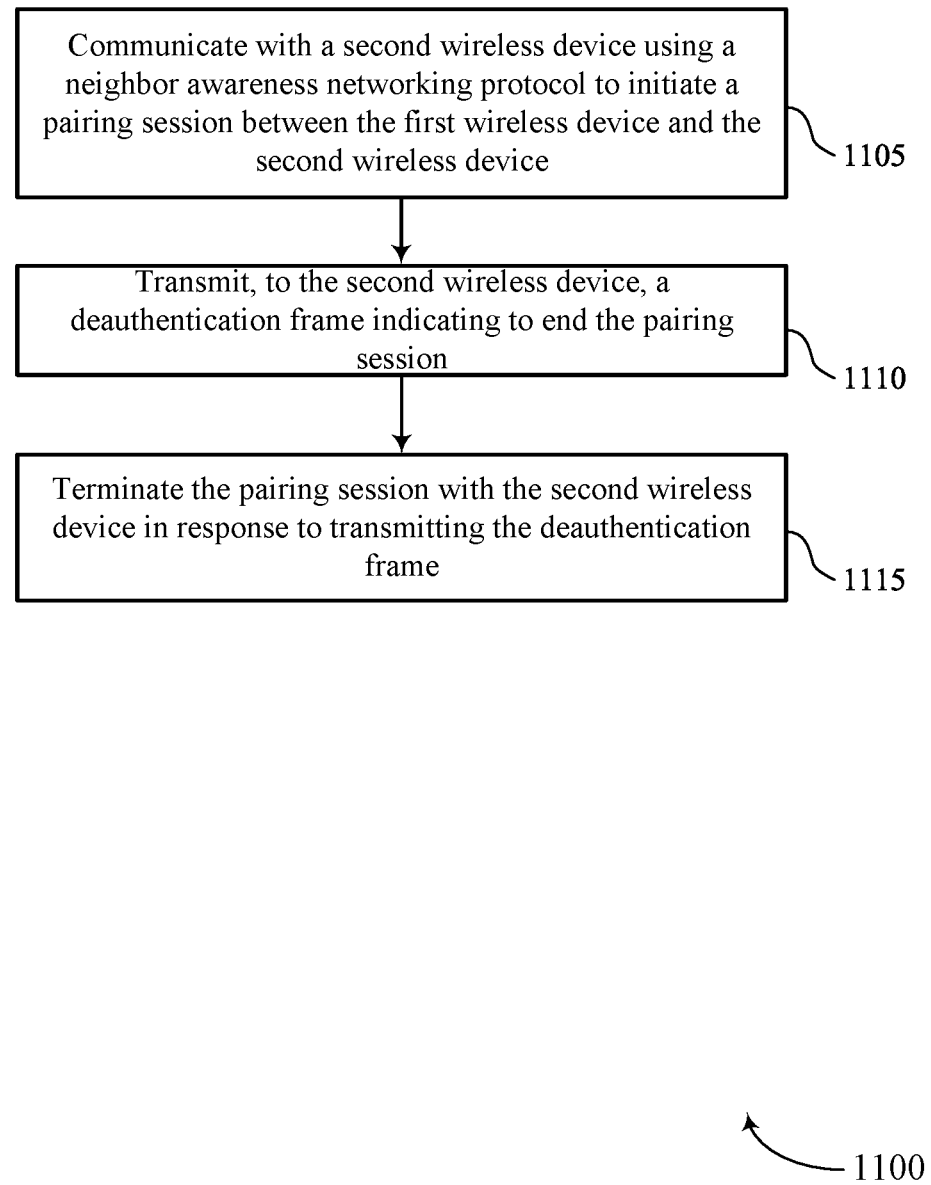
FIGS. 11 through 13 show flowcharts illustrating methods that support NAN pairing termination in accordance with one or more aspects of the present disclosure.

FIG. 11 shows a flowchart illustrating a method 1100 that supports NAN pairing termination in accordance with one or more aspects of the present disclosure. The operations of the method 1100 may be implemented by an STA or its components as described herein. For example, the operations of the method 1100 may be performed by an STA as described with reference to FIGs. FIG. 1 through 10. In some examples, an STA may execute a set of instructions to control the functional elements of the STA to perform the described functions. Additionally, or alternatively, the STA may perform aspects of the described functions using special-purpose hardware.

At 1105, the method may include communicating with a second wireless device using a NAN protocol to initiate a pairing session between the first wireless device and the second wireless device. The operations of 1105 may be performed in accordance with examples as disclosed herein. In some examples, aspects of the operations of 1105 may be performed by a NAN pairing initiation component 925 as described with reference to FIG. 9.

At 1110, the method may include transmitting, to the second wireless device, a deauthentication frame indicating to end the pairing session. The operations of 1110 may be performed in accordance with examples as disclosed herein. In some examples, aspects of the operations of 1110 may be performed by a deauthentication frame component 930 as described with reference to FIG. 9.

At 1115, the method may include terminating the pairing session with the second wireless device in response to transmitting the deauthentication frame. The operations of 1115 may be performed in accordance with examples as disclosed herein. In some examples, aspects of the operations of 1115 may be performed by a NAN pairing termination component 935 as described with reference to FIG. 9.

Figure 12:
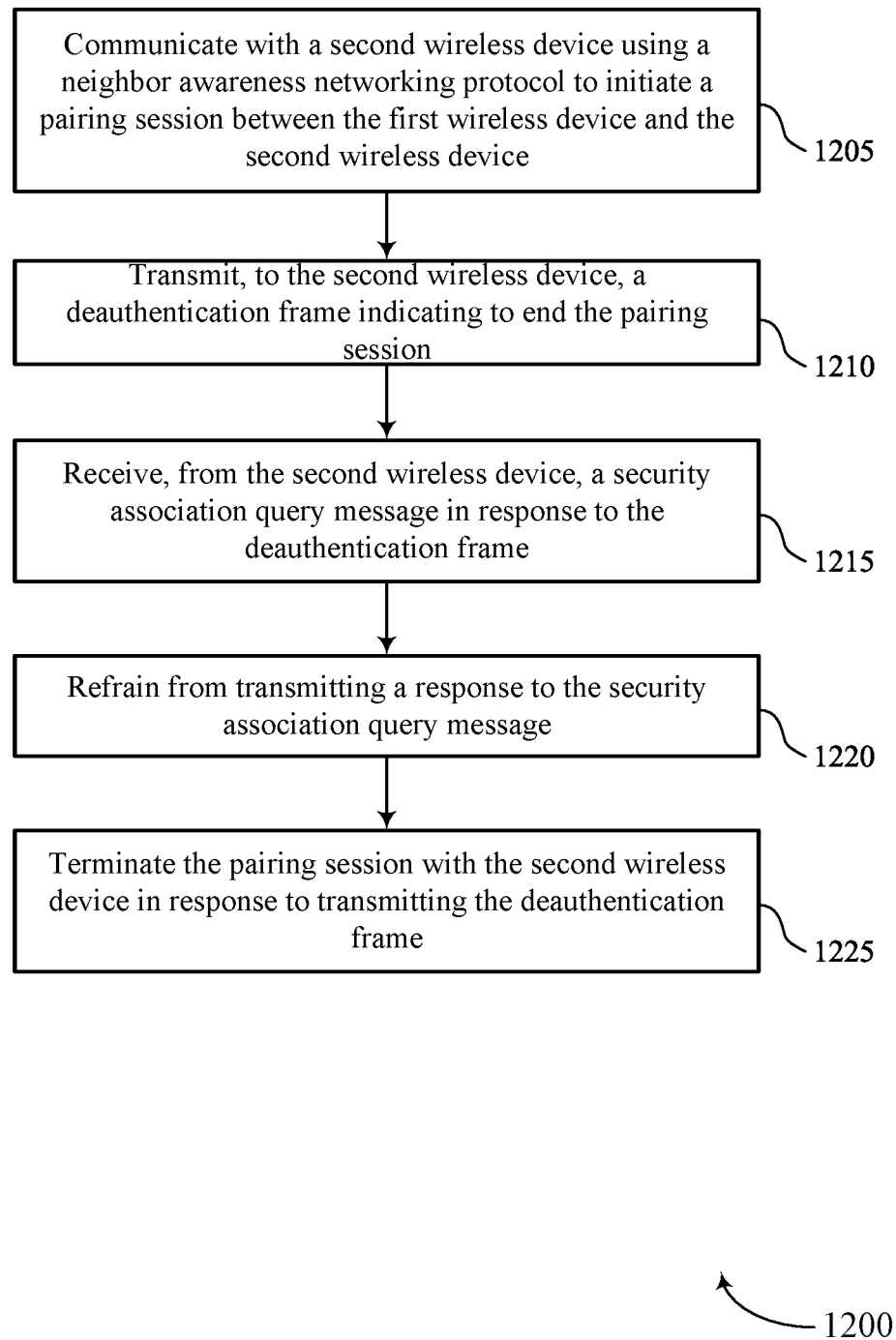

FIG. 12 shows a flowchart illustrating a method 1200 that supports NAN pairing termination in accordance with one or more aspects of the present disclosure. The operations of the method 1200 may be implemented by an STA or its components as described herein. For example, the operations of the method 1200 may be performed by an STA as described with reference to FIGs. FIG. 1 through 10. In some examples, an STA may execute a set of instructions to control the functional elements of the STA to perform the described functions. Additionally, or alternatively, the STA may perform aspects of the described functions using special-purpose hardware.

At 1205, the method may include communicating with a second wireless device using a NAN protocol to initiate a pairing session between the first wireless device and the second wireless device. The operations of 1205 may be performed in accordance with examples as disclosed herein. In some examples, aspects of the operations of 1205 may be performed by a NAN pairing initiation component 925 as described with reference to FIG. 9.

At 1210, the method may include transmitting, to the second wireless device, a deauthentication frame indicating to end the pairing session. The operations of 1210 may be performed in accordance with examples as disclosed herein. In some examples, aspects of the operations of 1210 may be performed by a deauthentication frame component 930 as described with reference to FIG. 9.

At 1215, the method may include receiving, from the second wireless device, a security association query message in response to the deauthentication frame. The operations of 1215 may be performed in accordance with examples as disclosed herein. In some examples, aspects of the operations of 1215 may be performed by a security association query component 950 as described with reference to FIG. 9.

At 1220, the method may include refraining from transmitting a response to the security association query message. The operations of 1220 may be performed in accordance with examples as disclosed herein. In some examples, aspects of the operations of 1220 may be performed by a security association response component 955 as described with reference to FIG. 9.

At 1225, the method may include terminating the pairing session with the second wireless device in response to transmitting the deauthentication frame. The operations of 1225 may be performed in accordance with examples as disclosed herein. In some examples, aspects of the operations of 1225 may be performed by a NAN pairing termination component 935 as described with reference to FIG. 9.

Figure 13:
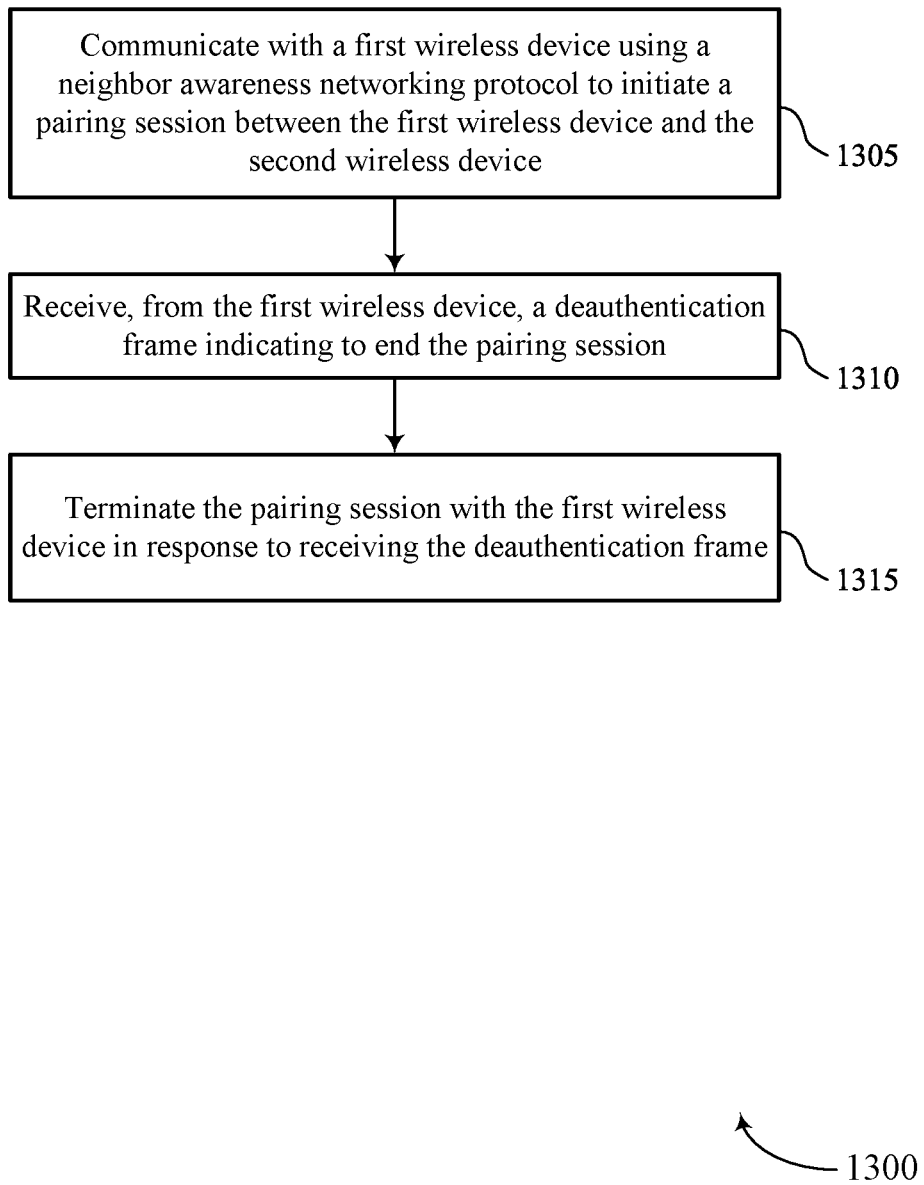

FIG. 13 shows a flowchart illustrating a method 1300 that supports NAN pairing termination in accordance with one or more aspects of the present disclosure. The operations of the method 1300 may be implemented by an STA or its components as described herein. For example, the operations of the method 1300 may be performed by an STA as described with reference to FIGs. FIG. 1 through 10. In some examples, an STA may execute a set of instructions to control the functional elements of the STA to perform the described functions. Additionally, or alternatively, the STA may perform aspects of the described functions using special-purpose hardware.

At 1305, the method may include communicating with a first wireless device using a NAN protocol to initiate a pairing session between the first wireless device and the second wireless device. The operations of 1305 may be performed in accordance with examples as disclosed herein. In some examples, aspects of the operations of 1305 may be performed by a NAN pairing initiation component 925 as described with reference to FIG. 9.

At 1310, the method may include receiving, from the first wireless device, a deauthentication frame indicating to end the pairing session. The operations of 1310 may be performed in accordance with examples as disclosed herein. In some examples, aspects of the operations of 1310 may be performed by a deauthentication frame component 930 as described with reference to FIG. 9.

At 1315, the method may include terminating the pairing session with the first wireless device in response to receiving the deauthentication frame. The operations of 1315 may be performed in accordance with examples as disclosed herein. In some examples, aspects of the operations of 1315 may be performed by a NAN pairing termination component 935 as described with reference to FIG. 9.

It should be noted that the methods described herein describe possible implementations, and that the operations and the steps may be rearranged or otherwise modified and that other implementations are possible. Furthermore, aspects from two or more of the methods may be combined.

The following provides an overview of aspects of the present disclosure:

Aspect 1: A method for wireless communications at a first wireless device, comprising: communicating with a second wireless device using a NAN protocol to initiate a pairing session between the first wireless device and the second wireless device; transmitting, to the second wireless device, a deauthentication frame indicating to end the pairing session; and terminating the pairing session with the second wireless device in response to transmitting the deauthentication frame.

Aspect 2: The method of aspect 1, wherein terminating the pairing session comprises removing an authentication key for communication between the first wireless device and the second wireless device.

Aspect 3: The method of aspect 2, further comprising: deriving, based at least in part on the pairing session, the authentication key.

Aspect 4: The method of aspect 3, further comprising: encrypting the deauthentication frame using the authentication key.

Aspect 5: The method of any of aspects 1 through 4, further comprising: receiving, from the second wireless device, an acknowledgment message in response to the deauthentication frame.

Aspect 6: The method of aspect 5, wherein transmitting the deauthentication frame comprises: unicasting the deauthentication frame to the second wireless device.

Aspect 7: The method of any of aspects 1 through 6, wherein the deauthentication frame comprises a header indicating a first interface address associated with the first wireless device and a second interface address associated with the second wireless device.

Aspect 8: The method of any of aspects 1 through 7, wherein the deauthentication frame comprises a field indicating a reason for terminating the pairing session.

Aspect 9: The method of any of aspects 1 through 8, wherein transmitting the deauthentication frame comprises: multicasting the deauthentication frame to the second wireless device and a third wireless device.

Aspect 10: The method of aspect 9, wherein the deauthentication frame comprises a header indicating a first interface address associated with the first wireless device and an identifier associated with a NAN cluster comprising the first wireless device, the second wireless device, and the third wireless device.

Aspect 11: The method of any of aspects 9 through 10, wherein transmitting the deauthentication frame comprises: transmitting the deauthentication frame in accordance with a group authentication key common to the first wireless device, the second wireless device, and the third wireless device.

Aspect 12: The method of any of aspects 1 through 11, further comprising: receiving, from the second wireless device, a security association query message in response to the deauthentication frame; and refraining from transmitting a response to the security association query message.

Aspect 13: The method of any of aspects 1 through 11, further comprising: receiving, from the second wireless device, a security association query message; and transmitting, to the second wireless device, a security association response message key in response to the security association query message.

Aspect 14: A method for wireless communications at a second wireless device, comprising: communicating with a first wireless device using a NAN protocol to initiate a pairing session between the first wireless device and the second wireless device; receiving, from the first wireless device, a deauthentication frame indicating to end the pairing session; and terminating the pairing session with the first wireless device in response to receiving the deauthentication frame.

Aspect 15: The method of aspect 14, wherein terminating the pairing session comprises removing an authentication key for communication between the first wireless device and the second wireless device.

Aspect 16: The method of aspect 15, further comprising: deriving, based at least in part on the pairing session, the authentication key.

Aspect 17: The method of aspect 16, further comprising: decrypting the deauthentication frame using the authentication key.

Aspect 18: The method of any of aspects 14 through 17, further comprising: transmitting, to the first wireless device, an acknowledgment message in response to the deauthentication frame.

Aspect 19: The method of any of aspects 14 through 18, wherein the deauthentication frame comprises a header indicating a first interface address associated with the first wireless device and a second interface address associated with the second wireless device.

Aspect 20: The method of any of aspects 14 through 19, wherein the deauthentication frame comprises a field indicating a reason for terminating the pairing session.

Aspect 21: The method of any of aspects 14 through 20, wherein the deauthentication frame comprises a header indicating a first interface address associated with the first wireless device and an identifier associated with a NAN cluster comprising the first wireless device, the second wireless device, and a third wireless device.

Aspect 22: The method of any of aspects 14 through 21, wherein receiving the deauthentication frame comprises: receiving the deauthentication frame in accordance with a group authentication key common the first wireless device, the second wireless device, and a third wireless device.

Aspect 23: The method of any of aspects 14 through 22, further comprising: transmitting, to the first wireless device, a security association query message; and receiving, from the first wireless device, a security association response message key in response to the security association query message.

Aspect 24: The method of any of aspects 14 through 22, further comprising: transmitting, to the first wireless device, a security association query message in response to the deauthentication frame, wherein terminating the pairing session is based at least in part on an absence of a response from the first wireless device to the security association query message within a query timeout period.

Aspect 25: An apparatus for wireless communications at a first wireless device, comprising a processor; memory coupled with the processor; and instructions stored in the memory and executable by the processor to cause the apparatus to perform a method of any of aspects 1 through 13.

Aspect 26: An apparatus for wireless communications at a first wireless device, comprising at least one means for performing a method of any of aspects 1 through 13.

Aspect 27: A non-transitory computer-readable medium storing code for wireless communications at a first wireless device, the code comprising instructions executable by a processor to perform a method of any of aspects 1 through 13.

Aspect 28: An apparatus for wireless communications at a second wireless device, comprising a processor; memory coupled with the processor; and instructions stored in the memory and executable by the processor to cause the apparatus to perform a method of any of aspects 14 through 24.

Aspect 29: An apparatus for wireless communications at a second wireless device, comprising at least one means for performing a method of any of aspects 14 through 24.

Aspect 30: A non-transitory computer-readable medium storing code for wireless communications at a second wireless device, the code comprising instructions executable by a processor to perform a method of any of aspects 14 through 24:

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc.

The downlink transmissions described herein may also be called forward link transmissions while the uplink transmissions may also be called reverse link transmissions. Each communication link described herein-including, for example, the WLAN 100 and the WLAN 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a first wireless device, comprising:
   one or more processors;
   memory coupled with the one or more processors; and
   instructions stored in the memory and executable by the one or more processors to cause the apparatus to:
   communicate with a second wireless device using a neighbor awareness networking (NAN) protocol to initiate a NAN pairing session between the first wireless device and the second wireless device;
   transmit, to the second wireless device, a deauthentication frame indicating to end the NAN pairing session, wherein the deauthentication frame further indicates to the second wireless device to remove an authentication key for encrypted communication between the first wireless device and the second wireless device; and
   terminate the NAN pairing session with the second wireless device in response to transmitting the deauthentication frame.

2. The apparatus of claim 1, wherein the instructions to terminate the NAN pairing session are executable by the one or more processors to cause the apparatus to:
   remove the authentication key for communication between the first wireless device and the second wireless device.

3. The apparatus of claim 2, wherein the instructions are further executable by the one or more processors to cause the apparatus to:
   derive, based at least in part on the NAN pairing session, the authentication key.

4. The apparatus of claim 3, wherein the instructions are further executable by the one or more processors to cause the apparatus to:
   encrypt the deauthentication frame using the authentication key.

5. The apparatus of claim 1, wherein the instructions are further executable by the one or more processors to cause the apparatus to:
   receive, from the second wireless device, an acknowledgment message in response to the deauthentication frame.

6. The apparatus of claim 5, wherein the instructions to transmit the deauthentication frame are executable by the one or more processors to cause the apparatus to:
   unicast the deauthentication frame to the second wireless device.

7. The apparatus of claim 1, wherein the deauthentication frame comprises a header indicating a first interface address associated with the first wireless device and a second interface address associated with the second wireless device.

8. The apparatus of claim 1, wherein the deauthentication frame comprises a field indicating a reason for terminating the NAN pairing session.

9. The apparatus of claim 1, wherein the instructions to transmit the deauthentication frame are executable by the one or more processors to cause the apparatus to:
   multicast the deauthentication frame to the second wireless device and a third wireless device.

10. The apparatus of claim 9, wherein the deauthentication frame comprises a header indicating a first interface address associated with the first wireless device and an identifier associated with a neighbor awareness networking cluster comprising the first wireless device, the second wireless device, and the third wireless device.

11. The apparatus of claim 9, wherein the instructions to transmit the deauthentication frame are executable by the one or more processors to cause the apparatus to:
   transmit the deauthentication frame in accordance with a group authentication key common to the first wireless device, the second wireless device, and the third wireless device.

12. The apparatus of claim 1, wherein the instructions are further executable by the one or more processors to cause the apparatus to:
   receive, from the second wireless device, a security association query message in response to the deauthentication frame; and
   refrain from transmitting a response to the security association query message.

13. The apparatus of claim 1, wherein the instructions are further executable by the one or more processors to cause the apparatus to:
- receive, from the second wireless device, a security association query message; and
- transmit, to the second wireless device, a security association response message key in response to the security association query message.

14. An apparatus for wireless communications at a second wireless device, comprising:
- one or more processors;
- memory coupled with the one or more processors; and
- instructions stored in the memory and executable by the one or more processors to cause the apparatus to:
  - communicate with a first wireless device using a neighbor awareness networking (NAN) protocol to initiate a NAN pairing session between the first wireless device and the second wireless device;
  - receive, from the first wireless device, a deauthentication frame indicating to end the NAN pairing session, wherein the deauthentication frame further indicates to the second wireless device to remove an authentication key for encrypted communication between the first wireless device and the second wireless device; and
  - terminate the NAN pairing session with the first wireless device in response to receiving the deauthentication frame.

15. The apparatus of claim 14, wherein the instructions to terminate the NAN pairing session are executable by the one or more processors to cause the apparatus to:
- remove the authentication key for communication between the first wireless device and the second wireless device.

16. The apparatus of claim 15, wherein the instructions are further executable by the one or more processors to cause the apparatus to:
- derive, based at least in part on the NAN pairing session, the authentication key.

17. The apparatus of claim 16, wherein the instructions are further executable by the one or more processors to cause the apparatus to:
- decrypt the deauthentication frame using the authentication key.

18. The apparatus of claim 14, wherein the instructions are further executable by the one or more processors to cause the apparatus to:
- transmit, to the first wireless device, an acknowledgment message in response to the deauthentication frame.

19. The apparatus of claim 14, wherein the deauthentication frame comprises a header indicating a first interface address associated with the first wireless device and a second interface address associated with the second wireless device.

20. The apparatus of claim 14, wherein the deauthentication frame comprises a field indicating a reason for terminating the NAN pairing session.

21. The apparatus of claim 14, wherein the deauthentication frame comprises a header indicating a first interface address associated with the first wireless device and an identifier associated with a neighbor awareness networking cluster comprising the first wireless device, the second wireless device, and a third wireless device.

22. The apparatus of claim 14, wherein the instructions to receive the deauthentication frame are executable by the one or more processors to cause the apparatus to:
- receive the deauthentication frame in accordance with a group authentication key common the first wireless device, the second wireless device, and a third wireless device.

23. The apparatus of claim 14, wherein the instructions are further executable by the one or more processors to cause the apparatus to:
- transmit, to the first wireless device, a security association query message; and
- receive, from the first wireless device, a security association response message key in response to the security association query message.

24. The apparatus of claim 14, wherein the instructions are further executable by the one or more processors to cause the apparatus to:
- transmit, to the first wireless device, a security association query message in response to the deauthentication frame, wherein terminating the NAN pairing session is based at least in part on an absence of a response from the first wireless device to the security association query message within a query timeout period.

25. A method for wireless communications at a first wireless device, comprising:
- communicating with a second wireless device using a neighbor awareness networking (NAN) protocol to initiate a NAN pairing session between the first wireless device and the second wireless device;
- transmitting, to the second wireless device, a deauthentication frame indicating to end the NAN pairing session, wherein the deauthentication frame further indicates to the second wireless device to remove an authentication key for encrypted communication between the first wireless device and the second wireless device; and
- terminating the NAN pairing session with the second wireless device in response to transmitting the deauthentication frame.

26. The method of claim 25, wherein terminating the NAN pairing session comprises removing the authentication key for communication between the first wireless device and the second wireless device.

27. The method of claim 26, further comprising:
- deriving, based at least in part on the NAN pairing session, the authentication key.

28. The method of claim 27, further comprising:
- encrypting the deauthentication frame using the authentication key.

29. The method of claim 25, further comprising:
- receiving, from the second wireless device, an acknowledgment message in response to the deauthentication frame.

30. A method for wireless communications at a second wireless device, comprising:
- communicating with a first wireless device using a neighbor awareness networking (NAN) protocol to initiate a NAN pairing session between the first wireless device and the second wireless device;
- receiving, from the first wireless device, a deauthentication frame indicating to end the NAN pairing session, wherein the deauthentication frame further indicates to the second wireless device to remove an authentication key for encrypted communication between the first wireless device and the second wireless device; and
- terminating the NAN pairing session with the first wireless device in response to receiving the deauthentication frame.

* * * * *